May 24, 1949.  A. H. DALL ET AL  2,471,097
PATTERN CONTROLLED MACHINE TOOL
Filed July 29, 1944  7 Sheets-Sheet 1

INVENTORS.
ALBERT H. DALL
HERMAN HORLACHER
BY Leigh W. Wright
ATTORNEY.

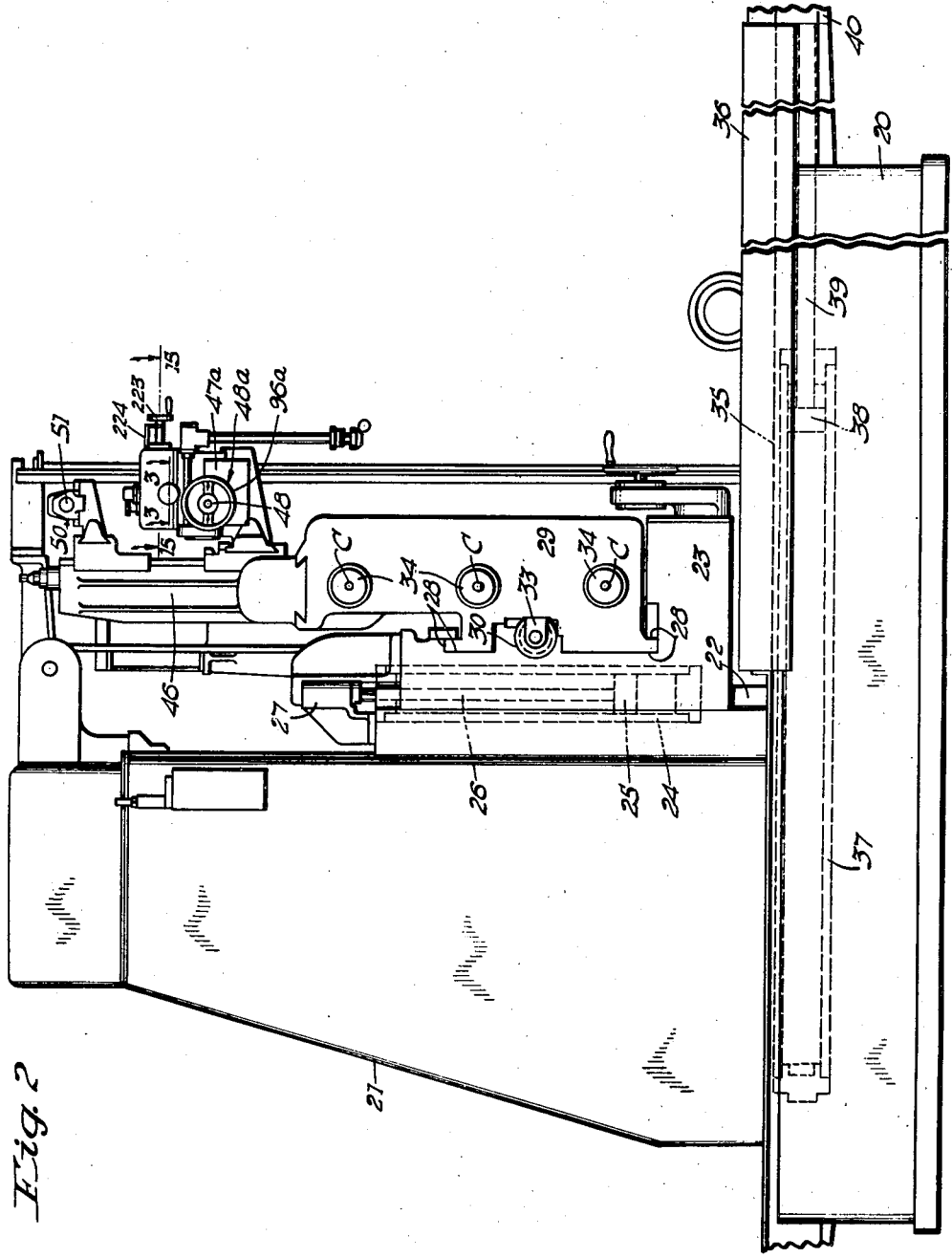

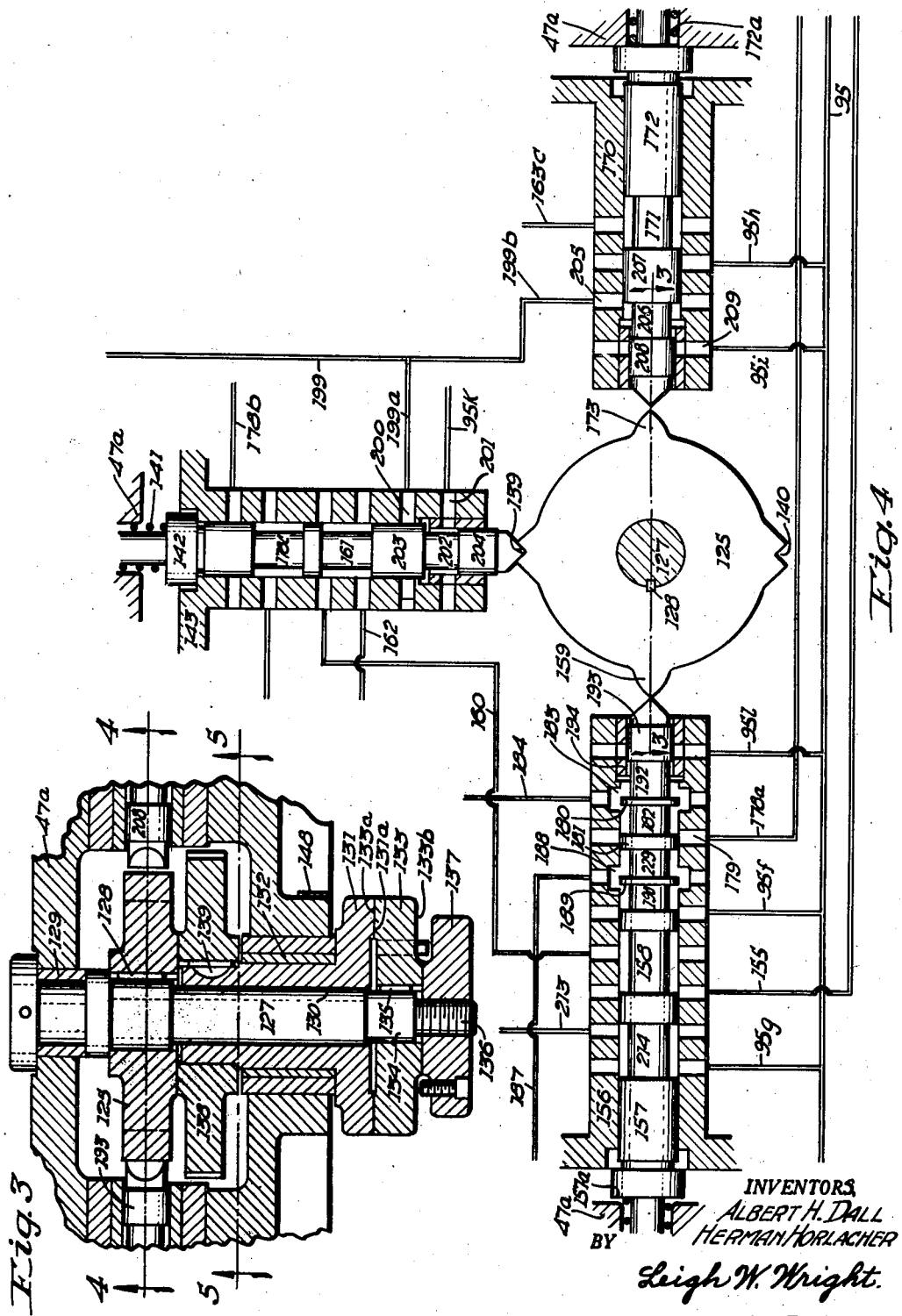

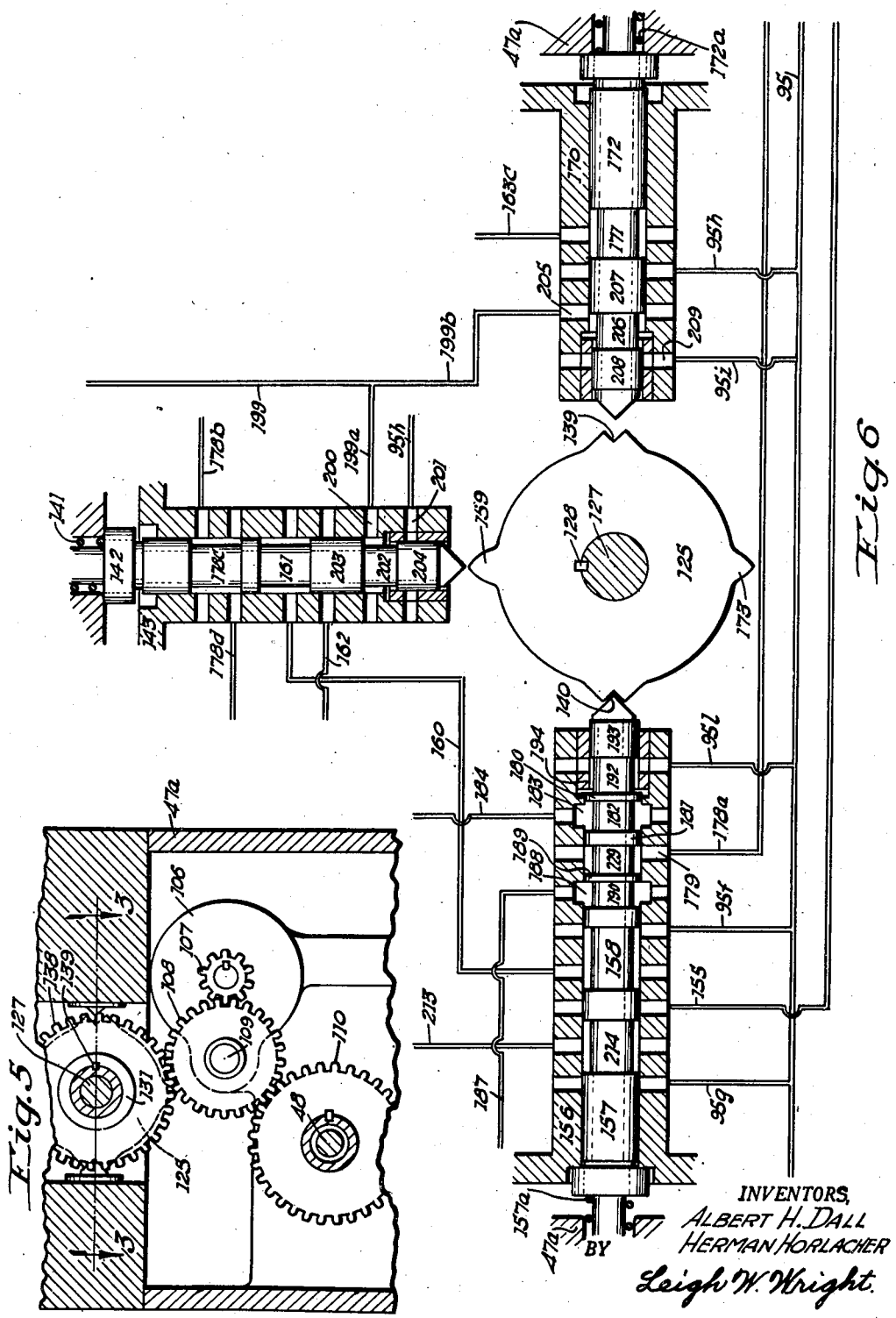

May 24, 1949.    A. H. DALL ET AL    2,471,097
PATTERN CONTROLLED MACHINE TOOL
Filed July 29, 1944    7 Sheets-Sheet 5
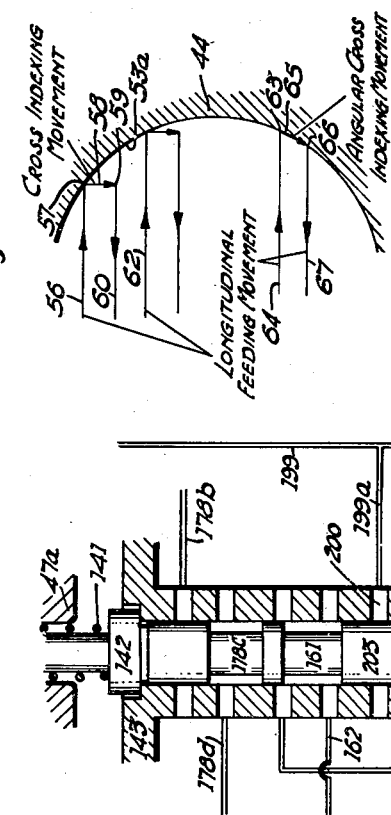
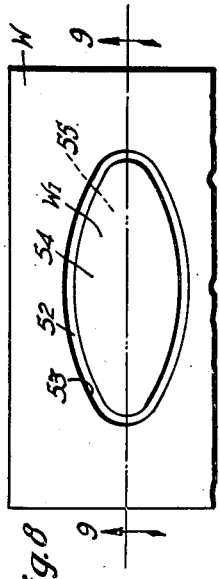
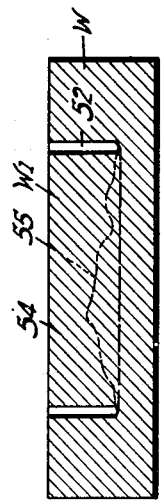
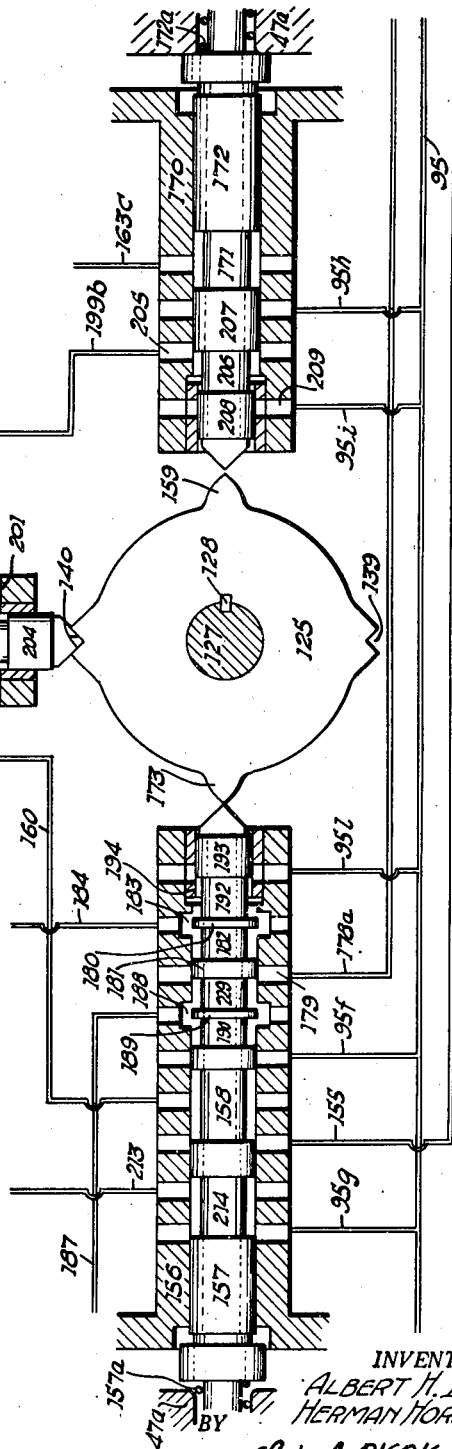
INVENTORS,
ALBERT H. DALL
HERMAN HORLACHER
BY Leigh W. Wright
ATTORNEY.

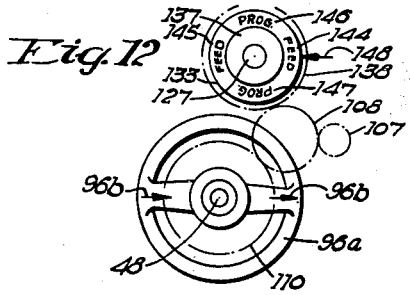
Fig. 12
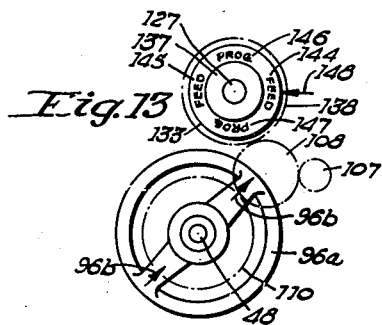
Fig. 13
Fig. 11
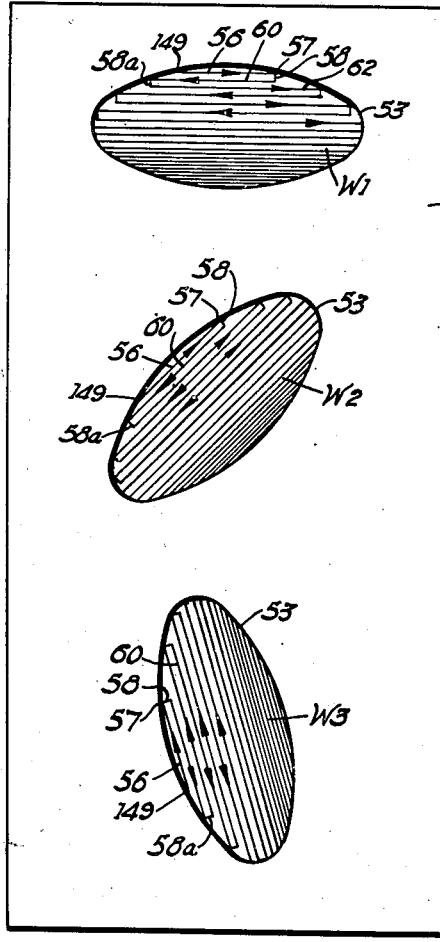
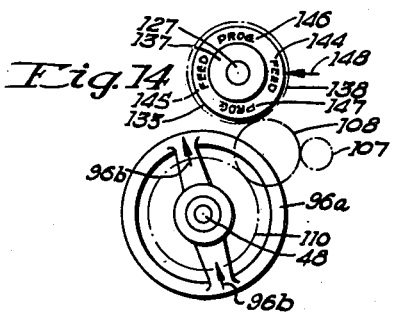
Fig. 14
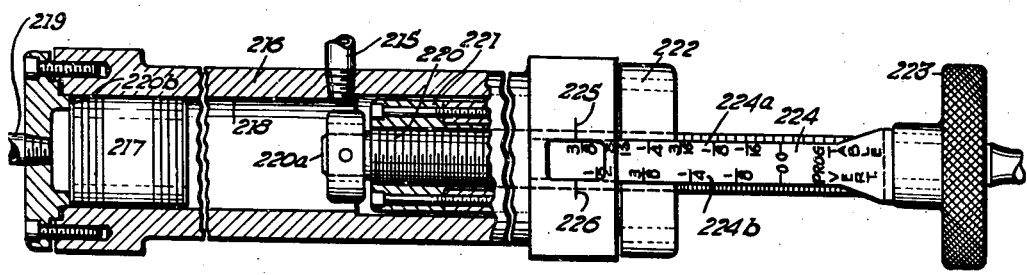
Fig. 15
INVENTORS,
ALBERT H. DALL
HERMAN HORLACHER
BY Leigh W. Wright.
ATTORNEY.

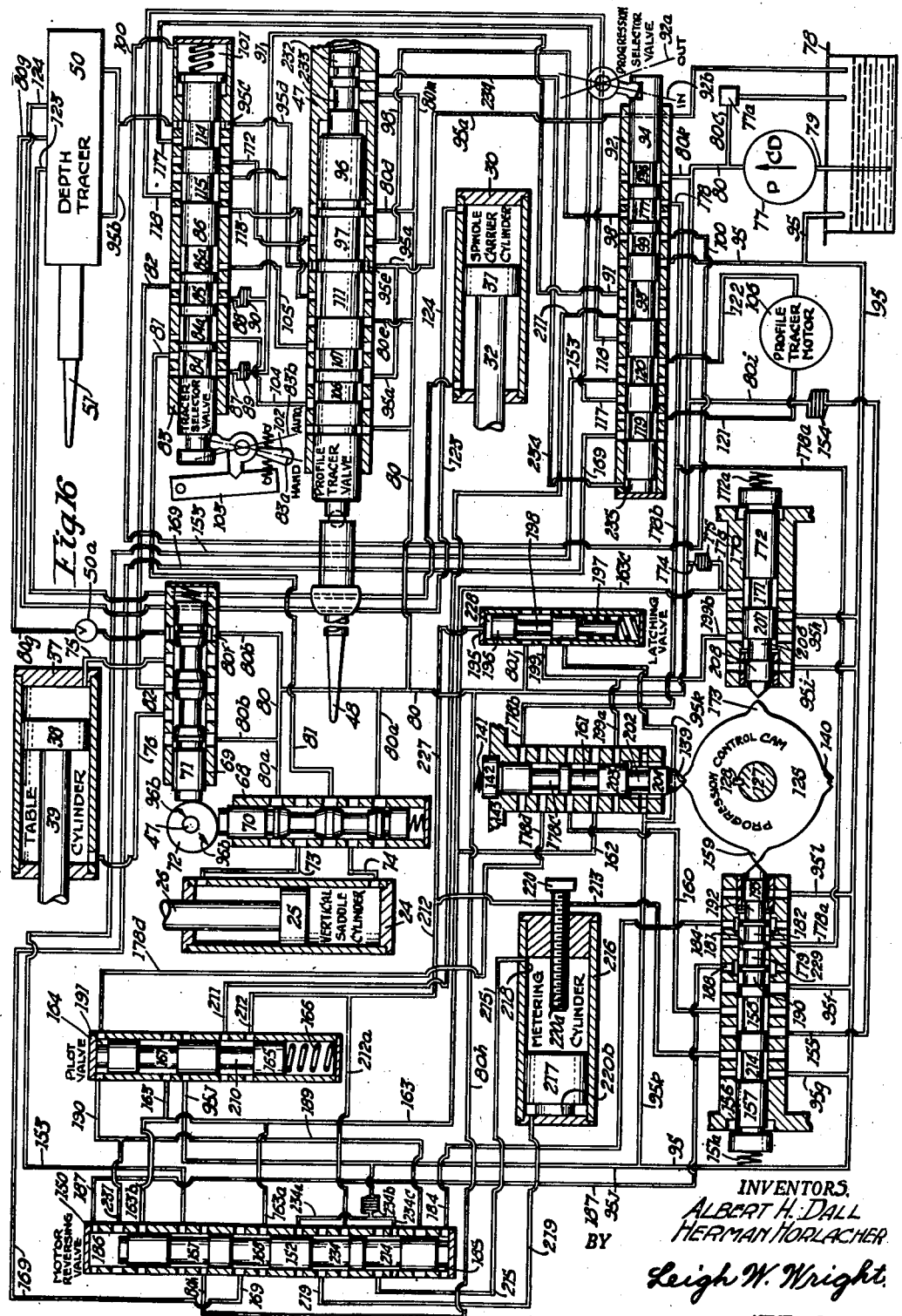

Patented May 24, 1949

2,471,097

UNITED STATES PATENT OFFICE 2,471,097

PATTERN CONTROLLED MACHINE TOOL

Albert H. Dall and Herman Horlacher, Cincinnati, Ohio, assignors to The Cincinnati Milling Machine Co., Cincinnati, Ohio, a corporation of Ohio Application July 29, 1944, Serial No. 547,200

34 Claims. (Cl. 90—13.5)

This invention relates to machine tools and more particularly to improvements in automatic pattern controlled milling machines.

One of the objects of this invention is to provide a pattern controlled milling machine which is operable automatically to produce three-dimensional surfaces on a work piece in a single continuous automatic operating cycle of the machine without attention on the part of the operator once the operating cycle has been initiated.

Another object is to provide an improved method of automatic die-sinking whereby three-dimensional surfaces may be rapidly and efficiently formed on a work piece without repositioning or otherwise moving the work piece or changing the operating conditions of the machine to thereby insure a high degree of fidelity between the pattern and the work piece with maximum productive output for the machine.

A further object is to provide an improved cross indexing arrangement in conjunction with reversible longitudinal feeding movements for effecting an automatic progression scanning operation on a three-dimensional work piece at any desired angular relationship to the direction of movement of the operating members of a pattern controlled milling machine.

It is also an object to provide indicating means in conjunction with the aforementioned automatic progression scanning arrangement which shows whether the tracer and cutter are operating in longitudinal feeding or cross indexing progression movements and in what direction said movements are taking place.

A further object is to provide an arrangement in which the feed rate of the longitudinal movement and the amount of cross indexing movement for the automatic progression operation may be independently adjusted and regulated.

It is also an object to provide in a pattern controlled milling machine a profile tracer and an associated pattern as the sole means to initiate and control the automatic progression scanning operation on a work piece.

Still another object is to provide selective control means which may be readily adjusted to permit the machine to perform manual profiling or diesinking, normal automatic profiling, or automatic progression scanning die-sinking operations.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 2 is a front elevational view of the machine shown in Figure 1 with the work and pattern frames removed from the work table of the machine.

Figure 3 is an enlarged fragmentary section on the line 3—3 of Figures 1 and 2.

Figure 4 is a diagrammatic section of a portion of the hydraulic progression control mechanism on the line 4—4 of Figures 1 and 3 showing one operative position of the parts of this mechanism.

Figure 5 is a fragmentary enlarged vertical section on the line 5—5 of Figure 3.

Figure 6 is a diagrammatic section of a portion of the hydraulic control mechanism similar to that of Figure 4 showing another operative position of the parts of this mechanism.

Figure 7 is a diagrammatic section of a portion of the hydraulic progression control mechanism of Figures 4 and 6 showing still another operative position of the parts.

Figure 8 is a fragmentary enlarged view of a portion of a work piece to be machined showing the preliminary profiling operation preparatory to initiating the automatic progression machining cycle.

Figure 9 is a section through the work piece on the line 9—9 of Figure 8.

Figure 10 is a diagrammatic view showing the path of travel of the tracer and cutter relative to the pattern and work during the automatic progression cycle.

Figure 11 is an enlarged face view of an exemplary work piece having a series of differently oriented portions to be machined.

Figure 12 is an enlarged diagrammatic view of the profile tracer direction control hand wheel and the automatic progression setting knob showing their relative positions when effecting horizontal longitudinal scanning feeding movement with downward progression movement in machining a work piece.

Figure 13 is a view similar to Figure 12 showing a setting for effecting angular automatic progression scanning of a work piece.

Figure 14 is a view similar to Figures 12 and 13 showing still another angular setting for effecting progression scanning of a work piece in still another angular direction.

Figure 15 is an enlarged fragmentary view, partly in section on the line 15—15 of Figure 1.

Figure 16 is a diagram of the hydraulic control circuit of the machine.

Figure 1:
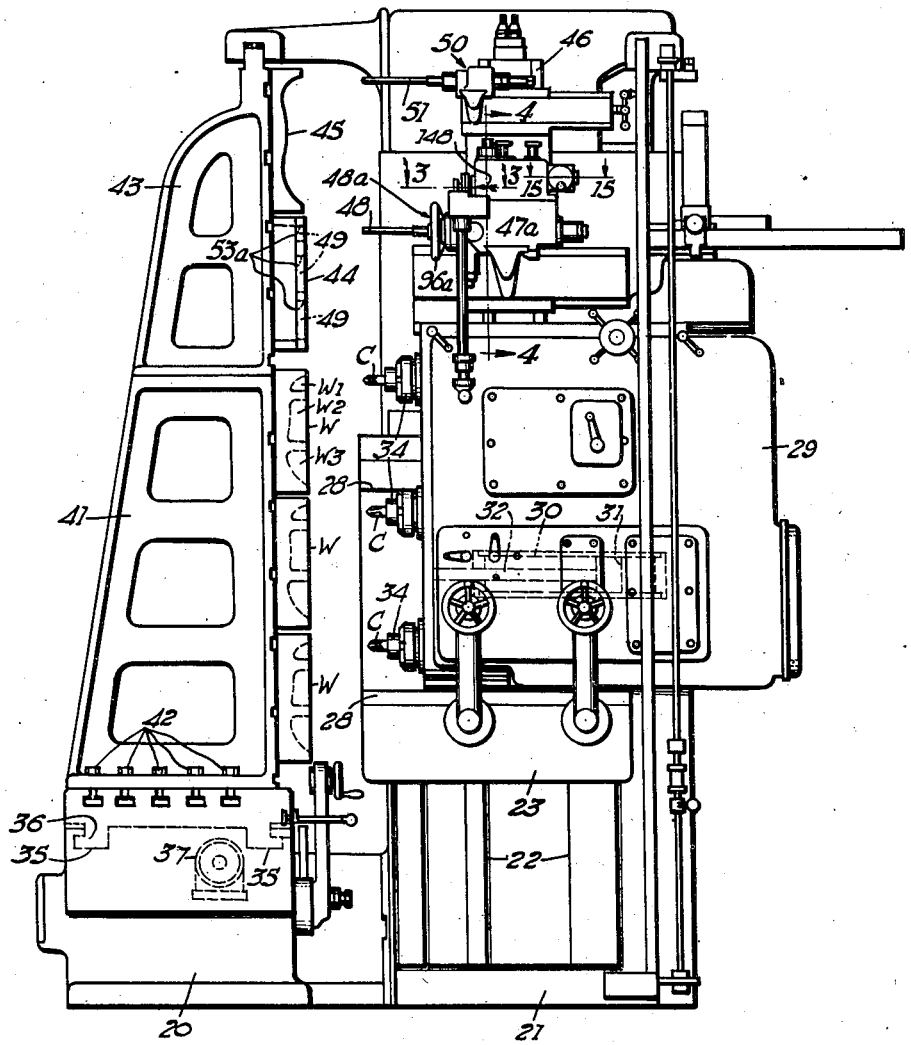
Figure 1 is a right hand side elevational view from the operator's position of a multiple spindle pattern controlled milling machine incorporating the features of this invention.

For illustrative purposes this invention is shown applied to a multiple spindle pattern controlled milling machine comprising a base 20 to the rear portion of which is rigidly fixed the column 21 having vertical guideways 22 upon which is reciprocatably mounted the saddle 23 and which may be actuated in vertical movement by a suitable fluid pressure motor or cylinder 24 which is attached to the saddle and has a piston 25 and a piston rod 26 whose outer end is connected by a bracket 27 fixed to the column 21 of the machine. On the saddle 23 are guideways 28 upon which is mounted a spindle carrier 29 which may be actuated in horizontal movement on the ways 28 by means of a suitable fluid pressure motor or cylinder 30 having a piston 31 and a piston rod 32. The cylinder 30 is rigidly held to the saddle 23 and the piston rod 32 is connected by a suitable bracket 33, Figure 2, to the spindle carrier 29. In the spindle carrier is journaled, in this particular illustrative example, a series of three cutter spindles 34 each of which may be driven at appropriate cutting speed by a suitable power transmission of any conventional design.

On appropriate guideways 35 formed on the top of the base 20 is mounted the work and pattern table 36 for horizontal reciprocating movement perpendicular to the direction of movement of the saddle 23 and spindle carrier 29. The table 36 is actuable on the ways 35 by a fluid pressure motor or cylinder 37 fixed in the base 20 and having a piston 38 connected through a piston rod 39 to a bracket 40 mounted on the table 36. In this way three directions of perpendicular movement are provided by the saddle 23, spindle carrier 29, and table 36.

Mounted rigidly to the top of the table 36 is the work holding frame 41 by suitable clamping bolts 42. Mounted on the frame 41 is a series of work pieces or die blocks W having work cavities W—1, W—2 and W—3, Figures 1 and 11, to be machined by the repective cutters C carried in the work spindles 34 as best seen in Figure 1. On top of the frame 41 is an auxiliary frame 43 which carries the profile pattern 44 and the depth control pattern 45.

On an appropriate bracket 46 mounted on the spindle carrier is a profile tracer having a housing 47a with a universally mounted tracer finger 48 journaled therein which operates in the various profile openings 49 provided in the usual manner in the profile pattern 44, Figure 1. These openings 49 correspond to the desired outline or profile of the work surfaces to be machined. Also mounted on the bracket 46 carried by the saddle 29 is a depth tracer, indicated generally at 50, having a tracer finger 51 which operates in appropriate contact with the depth pattern 45.

Generally in this arrangement the profile tracer head 48a controls the simultaneous relative movement of the saddle 23 and the table 36 for performing 360° profile tracing movements while the depth tracer 50 having tracer finger 51 may be operated simultaneously with the profile tracer 48a to effect the third dimensional depth control by controlling the horizontal movement of the spindle carrier 29 to and from the work pieces and patterns on the table 36.

In order to carry out the machining of such three dimensional surfaces, such as the surfaces W—1, W—2 and W—3 of the work pieces W in an efficient and automatic manner it is first preferable to effect a 360° profiling cut such, as indicated at 52 in Figures 8 and 9, by allowing the profile tracer 48 to automatically follow around the profile pattern portions 49 of the pattern 44 and while also utilizing the depth tracer 51 if necessary. In this way the profile outline surface 53 of the work is established and completed, leaving a central portion 54 to be removed to ultimately produce a three-dimensional surface, for example, as shown at 55 in Figure 9.

The invention of this case is particularly directed to a machine capable of automatically producing the three-dimentional surface 55 by the removal of the portion 54 from the work W. This operation is accomplished in an automatic manner by a back and forth longitudinal feeding or scanning movement of the cutter across the section 54 while intermittently cross indexing the cutter at right angles to this longitudinal feeding movement at the completion of each stroke so as to ultimately progress across the entire surface to remove the portion 54 down to the desired three-dimensional surface 55. With the present arrangement, the cross indexing and longitudinal feeding movements are under all conditions maintained within the confines of the outline profile of the actual work surface to be machined. It is also possible with this arrangement to effect the longitudinal feeding movements and the cross indexing movements in any desired angular direction at any time by minor adjustments of the apparatus without requiring the movement of the work in the machine or any reorganization of the machine set-up. This type of machining operation comprising the automatic sequential operation of cross indexing movement and longitudinal movement to scan a three-dimensional work surface may be known as an automatic progression scanning operation. When the cross indexing and longitudinal movements take place in angularly related directions to the directions of movement of the machine members or slides, the operation may be termed an automatic angular progression operation.

In Figure 10 is diagrammatically illustrated a typical path of cutting movement as effected in the present arrangement in which the tracer and cutter are feeding longitudinally to the right along the horizontal line 56 during which time the profile tracer finger 48 is not contacting any pattern but is moving in space while in undeflected condition. The depth tracer 51 may be operating in a conventional way in engagement with the depth pattern 45 to effect the proper in and out positioning of the spindle carrier 29 relative to the work pieces and pattern 45. As the profile tracer finger 48 arrives at the point 57 it engages the surface 53a of the profile pattern 44 corresponding to the work portion W—1 to be machined and is deflected causing the tracer head 48a to automatically rotate clockwise 90° to thus cause the cutters and tracer to move in cross feeding direction along the line 58, the length of the travel along the line 58 being determined by an arrangement entirely independent and unaffected by the rate of feed in traveling along the line 56. When the point 59 is reached, automatic means again rotates the tracer head clockwise another 90° and again establishes longitudinal feeding in the opposite direction along the line 60 to effect another cutting stroke across the work surface. When the other side of the profile pattern surface 53a of the profile pattern 44 is reached the tracer head is automatically rotated counterclockwise 90°, cross feeding then takes place along the line 58a, Figures 10 and 11, for a cross movement of a definite predetermined amount independent of the feed, and finally the tracer head is rotated counterclockwise automatically another 90° to again effect the longitudinal feeding motion to the right along the line 62 to ultimately cover the entire work surface 55 automatically.

In certain instances the work surface may have a converging or reentrant type of surface profile, such as shown at the point 63, so that as the tracer 48 strikes the surface 53a at point 63 while traveling along line 64 it must rotate the tracer head more than 90° clockwise before cross feeding movement takes place to prevent the cutters from otherwise cutting into and beyond the desired surface 53 of the work. Automatic mechanism is provided so that when the tracer is moving along the line 64 and is deflected at the point 63, the tracer head will rotate not only through the 90° movement but will automatically continue until it arrives at a suitable direction of movement, indicated by the arrow 65, sufficient to properly clear the work surface 53 at that point before the cross feeding movement takes place. The cross feeding then takes place in the direction of the arrow 65 until the tracer has arrived at the point 66 whereupon automatic means is further provided for finally rotating the head the remaining portion of its 180° clockwise rotation from the point 63 to effect the proper direction of longitudinal feeding movement along the line 67 for continuing the automatic progression cycle. All of the above machining movements are conducted automatically from the time they are initially set into operation at the point 149, Figure 11, until the entire work surface 55 has been scanned by this automatic progression machining operation.

It is obvious that in order to get the maximum production from such a machining operation it is preferable to minimize as much as possible the necessary reversals of direction of longitudinal feeding movement of the tracer and cutter across the work surface. It is, therefore, desirable to effect, so far as possible, the longitudinal feed movement in a direction substantially parallel to the greatest longitudinal extent of the work surface being machined. For example, in Figure 11 the work surface W—1 is preferably scanned by horizontal movement as shown because the greatest longitudinal extent of this work surface is in a horizontal direction. It may, however, occur that there should be work surfaces angularly disposed as shown in W—2 and W—3 in which their greatest longitudinal extent is not horizontal nor parallel to any of the main slide movements of the machine. When this latter condition exists one of the slide members of the machine cannot be used to effect the cross indexing movement unless the work piece be shifted on the machine to bring its configuration in proper position relative to the direction of movement of the slides. In instances where there are to be a plurality of differently oriented surfaces prepared on a single work piece, such as shown in Figure 11, it is not practical from the standpoint of ultimate accuracy and high productivity to adjust the work on the machine to take care of such conditions with the result that great loss of time results in having to confine the scanning movements to directions parallel with the movable machine members.

With the present arrangement, however, by the mere adjustment of a control knob the operator may readily effect the automatic progression movement, as described above, in Figure 10, in any angular direction such as that shown at W—2 and W—3 in Figure 11 without in any way readjusting the work piece in the machine or otherwise modifying the general operation of the machine set-up. In this way the number of reversals required to scan the entire work surface is reduced to a minimum by accommodating the automatic progression to the greatest longitudinal extent of the work surface being machined.

In order to obtain the above method of operation, it is preferable to utilize a tracer head construction having the tracer finger 48 so as to effect 360° profiling movements in a manner, for example, as set forth in Patent 2,332,533, issued October 26, 1943, in which arrangement there is provided a pair of reversing valves 68 and 69, Figure 16, having appropriate valve plungers 70 and 71 actuated simultaneously by means of a direction and feed control eccentric cam 72 as the tracer head 48a is rotated to effect the 360° tracing operation. The reversing valve 68 is connected to the vertical saddle cylinder 24 by lines 73 and 74 while the reversing valve 69 is connected by appropriate lines 75 and 76 to the table actuating cylinder 37.

Fluid pressure for actuating the machine members is derived from the main hydraulic pump 77 driven by a suitable prime mover (not shown) which withdraws fluid from the reservoir 78 through a suction line 79 and transmits fluid under pressure into the pressure supply line 80 which is connected to the reversing valve 68 by appropriate branch lines 80a and connected to the reversing valve 69 by appropriate branch lines 80b. A suitable pressure relief valve 77a connected by a branch line 80c to the line 80 serves to maintain the proper desired pressure in the line 80 under all operating conditions.

Discharge from the valve 68 passes out through the return line 81 and discharge from the valve 69 passes out through the return line 82. These lines are connected to the tracer selector valve 83 which is a two-position valve having a "hand" position 83a and an "automatic" position 83b, the valve being shown in the hand position in Figure 16. With the tracer selector valve 83 in the hand position 83a as shown the return lines 81 and 82 from the reversing valves 68 and 69 are connected through appropriate annular grooves 84 and 85 of the valve plunger 86 to lines 87 and 88 respectively in which are serially connected resistances 89 and 90 to regulate the discharge from the lines 81 and 82. Outflow from the resistances 89 and 90 are communicated to a line 91 which is connected to a progression selector valve 92, which is a two-position control valve having an "out" position 92a for the normal tracing operations for the machine and an "in" position 92b for the automatic angular progression movements to be effected in the machine. The valve 92 is shown in Figure 16 in the progression "in" position 92b. With the progression selector valve 92 positioned in the "out" position 92a the line 91 will be connected through the annular groove 93 of the valve plunger 94 to the drain line 95 for return of fluid to the reservoir 78. Thus, under these conditions fluid supply from the pump 77 is controlled by the reversing valves 68 and 69 upon rotation of the tracer head and eccentric 72 to effect a simultaneous operation of the saddle cylinder 24 and the table cylinder 27 to provide a resultant universal profiling movement for the machine. The eccentric 72 may be rotated to any desired position to effect the desired resultant direction of movement by the usual hand wheel 96a upon which are indicating pointers 96b showing the direction in which the tracers and cutters are moving relative to the patterns and work. The rate of feeding is determined by the eccentricity of the eccentric 72 which may be adjustable from zero to maximum to effect any desired rate of feed in the direction indicated by the arrows 96b or to stop feeding motion when set to zero. Thus, when the tracer selector valve 83 is in the "hand" position 83a and the progression selector valve 92 is in its "out" position 92a the machine is arranged for manual directing of the tracer head and cutters to or from the work surface to be machined under guidance of the handwheel 96a.

The tracer head 48a including the tracer finger 48, the eccentric 72, and the hand wheel 96 may be automatically rotated to obtain desired directions of feeding for automatic profiling operations. In this arrangement, as the tracer finger 48 is moved under manual direction to engage the pattern, its deflection results in the profile tracer valve plunger 96 of the tracer valve 47 being displaced axially (to the right in Figure 16) so as to connect the branch pressure line 80d connected to the valve 47 through the annular groove 97 of the valve plunger 96 to a pressure output line 98 which is connected to the progression selector valve 92, and when this valve is in its "out" position 92a line 98 is connected through the annular groove 99 of its valve plunger 94 to a line 100 which in turn is connected to a pressure chamber 101 formed behind the plunger 86 of the tracer selector valve 83 to thereby force the plunger 86 axially (to the left in Figure 16) moving its control lever 102 out of the detent member 103 from the "hand" position 83a to its "automatic" position 83b.

As a result of this automatic operation of the tracer selector valve 83, the return lines 81 and 82 from the reversing valves 68 and 69 of the saddle and table cylinders are now connected through the annular grooves 84a and 85a to the lines 104 and 105 to the profile tracer valve 47 in such a way that the annular grooves 106 and 107 formed in the valve plunger 96 and communicating with the branch line 95a of the drain line 95 serve to effect increasing or decreasing rates of flow in the return lines 81 and 82 for the saddle and table cylinders so that the greater the deflection of the tracer the greater will be the restriction to flow out of the lines 81 and 82 and when the tracer is in its normal tracing position the desired normal flow out through lines 81 and 82 will then take place.

When the tracer selector valve 83 is tripped from "hand" to "automatic" position the hydraulic tracer head rotating motor 106 is rendered operative to effect automatic rotation of the tracer head to maintain the tracer head 48a in proper constant engagement with the profile pattern 44. This hydraulic motor 106, Figure 5, is mounted is mounted in the profile tracer housing 47a and has a driving pinion 107 which drives an appropriate idler gear 108 journaled on a shaft 109 in the tracer housing 47a. The idler gear 108, in turn, is in driving engagement with a gear 110 appropriately connected to the tracer head and hand wheel 96a in any suitable manner so as to rotate the tracer head 48a including the operating eccentric 72, and the hand wheel 96 by power from the hydraulic motor 106. When the tracer selector valve 83 is in the "automatic" position 83b and the progression selector valve 92 is in its "out" position 92a fluid pressure from the hydraulic pump 77 transmitted through the line 80 and the branch lines 80d and 80e to the tracer control valve 47 is reversibly connectable through the annular grooves 97 and 111 of the tracer valve plunger 96 to the respective lines 112 and 113. These lines are connected through the tracer selector valve 83 through the respective annular grooves 114 and 115 to the lines 117 and 118 connected to the progression selector valve 92. This valve 92 when in its "out" position connects the lines 117 and 118 through the corresponding annular grooves 119 and 120 formed in the valve plunger 94 to the respective lines 121 and 122 connected to the hydraulic tracer rotating motor 106. Thus, as the tracer 48 is deflected and underdeflected relative to its normal tracing position reversal operation of the profile tracer motor takes place to maintain the eccentric 72 and the direction of arrows 96b appropriately oriented to cause the tracer to follow the pattern automatically. The above described apparatus and its operation is fully set forth in the above-mentioned Patent 2,332,533 in view of which further detailed description of the above apparatus is deemed unnecessary.

In order to arrange the machine to cut the initial profile groove 52 as shown in Figures 8 and 9, the machine is set in the automatic profiling operating condition above described with the tracer selector valve 83 in the "automatic" position 83b and the progression selector valve 92 in its "out" position.

At this time also the depth tracer 50 may also be put into operation by opening the stop cock 50a in the pressure supply line 80g connected to the line 80 from the main hydraulic pump 77. The pressure supply line 80b is connected around the valve 69 as shown in Figure 16 by a suitable annular groove 80f to supply pressure to the line 80g which in turn is connected to the depth tracer valve 50. Suitable control lines 123 and 124 are connected to the spindle carrier cylinder 30. Return of fluid from the depth tracer is conducted through the drain line 95b and is by-passed around the tracer selector valve 83 by suitable annular groove 95c connected to the drain line 95d which is by-passed around the tracer valve 47 by a suitable annular groove 95e, which in turn is connected to the drain line 95a, returning fluid to the reservoir 78.

In order to effect and control the automatic progression scanning movement of the machine there is provided a combined detent and control disc cam 125, referring particularly to Figures 3 and 5, which is fixed to the same shaft 127 by suitable key 128, and which shaft is journaled in a suitable bearing 129 in the profile tracer housing 47a and is also journaled in a bore 130 formed in a clutch sleeve member 131 which, in turn, is journaled in a suitable bearing 132 in the housing 47a. On the outer end of the shaft 127 is mounted a clutch disc 133 for axial movement on the bearing portion 134 (of the shaft 127) and keyed in rotary driving relationship thereon by suitable key 135. This clutch member 133 has a friction face 133a which is adapted to abut in frictional driving relationship against the mating face 131a of the clutch sleeve member 131. On the outer threaded end 136 of the shaft 127 is mounted a threaded clamping knob 137 which may be rotated so as to firmly engage the surfaces 131a and 133a to effect driving relationship between the clutch sleeve 131 and the clutch member 133 in order that the shaft 127 and the sleeve 131 may be normally rotated as a unitary member. In this way, the shaft 127 may be clamped in any circumferentially oriented position relative to the sleeve 131.

On the sleeve 131 is fixed a driving gear 138 by a suitable key 139 and which gear 138 is of the same diameter and number of teeth as the gear 110 for rotating the tracer head 48a, the gear 138 also meshing with the idler gear 108 so that the disc cam 125 will rotate in synchronism with the rotation of the tracer head. Thus, it will be noted that when the clutch faces 131a and 133a are engaged by tightening the knob 137, the control cam 135 will rotate in synchronism with the hand wheel 96a and that by loosening the clutch clamping knob 137 the hand wheel 96a may be reoriented in any circumferential position relative to the disc cam 125 and locked into driving engagement therewith by again tightening the knob 137.

The automatic progression control disc cam 125 has a pair of diametrically oppositely disposed detent notches 139 and 140, each of which may engage the plunger 142 of a control valve 143 carried in the tracer housing 47a. The plunger 142 is normally urged toward the disc cam 125 by the spring 141 to engage either one of the detent notches to hold the disc cam 125 in the position shown in Figure 4 or in the position with the detent notch 140 engaged by the plunger 142, as shown in Figure 7. When the disc cam 125 is held in either of these positions by the valve plunger 142, longitudinal scanning feeding movement is being effected and in a direction indicated by the pointers 96b on the hand wheel 96a. This feeding movement may take place in any desired direction dependent upon the relative circumferential setting of the hand wheel 96a with respect to the disc cam 125. The clutch member 133 which is rotatably driven at all times by the cam shaft 127 is provided on its face 133b with the notations shown in Figures 12, 13 and 14 consisting of the two diametrically opposed "feed" positions 144 and 145 and at 90° thereto the diametrically opposed "progression" positions 146 and 147 which cooperate with an indicating pointer 148 on the tracer housing 47a so as to show the position of the parts of the machine during automatic progression movements. In other words, when the "feed" notation 144 or 145 is in position at the pointer 148 longitudinal feeding motion is being effected in the direction indicated by the drection arrows 96b of the hand wheel 96a, and likewise when the tracer head has been rotated 90° from the feeding position the "progression" indicating marks 146 and 147 are presented in position to the indicating pointer 148 to indicate that cross indexing progresson movement is taking place and in a direction indicated by the arrows 96b of the hand wheel 96a.

Assuming the work surface W—1, Figure 11, is to be machined by automatic progression, it will be noted that the greatest longitudinal extent of the work surface is in a horizontal direction so that it is preferable to effect the back and forth longitudinal scanning feeding movements in this horizontal direction to thereby minimze the number of reversals and cross indexing movements required to complete the work to thereby increase the rapidity of production of the machine. In order to set up the machine for automatic progression of this particular surface W—1, the hand wheel 96a is rotated to the position shown in Figure 12 indicating the direction of longitudinal feed movement it is desired to effect. Having done this, the knob 137 (Figure 3) is loosened and the cam shaft 127 and the disc cam 125 are rotated by turning the clutch member 133 so as to bring a "feed" position 144 into alignment with the indicating pointer 148. The knob 137 is then tightened and with the tracer selector valve in the "hand" position and the progression selector valve 92 moved to its "in" position the machine is then started and the automatic back and forth feeding movement commences.

When it is desired to set up the machine for doing a work surface such as W—2 in Figure 11 again the hand wheel 96a is positioned with its pointers 96b indicating the desired back and forth longitudinal feeding movement in accordance with the angular relationship of the greatest longitudinal extent of the work surface W—2. The clutch member, cam shaft 127, and disc cam 125 are again circumferentially reoriented to bring a "feed" position 144 into position with the indicator 148 and the knob 137 again clamped so as to effect an angular positioning of the direction of longitudinal feed movement indicated by the arrows 96b as shown in Figure 13.

Similarly, the reorientation of the hand wheel 96a for doing a surface such as W—3 in Figure 11 is clearly indicated in Figure 14 and may be likewise accomplished by adjusting the knob 137 and reorienting the disc cam 125 relative to the hand wheel 96a.

Thus, it will be noted that any degree of automatic angular progression may be quickly set up by simply adjusting the knob 137 and setting the hand wheel 96a to the desired direction for effecting the progression and without in any way reorienting the work piece in the machine. Thus, any direction of angular automatic progression may readily be effected on any single work piece in the machine.

The detail arrangement of the hydraulic operating and control mechanism for effecting these results is as follows: assuming automatic progression scanning of the work surface W—1, Figure 11, is to be done, the hand wheel 96a is oriented relative to the disc cam 125 as shown in Figure 12. The tracer selector valve 83 is positioned in the "hand" position and the progression selector valve 92 is moved to its "in" position as shown in Figure 16. The machining operation is begun at a point 149, Figure 11, and proceeds in longitudinal feeding movement to the right along a line 56, Figures 10 and 11 as described. Under these conditions the profile tracer head motor 106 is rendered inoperative and the disc cam 125 and tracer head 48a are held against rotation by the plunger 142 of valve 143 engaging in the detent notch 139 of the disc cam 125. Under these conditions a motor reversing valve 150, Figure 16, for controlling the reversal operation of the tracer head motor 106 is so positioned that pump pressure supplied through the pressure line 80 and branch line 80h to the valve 150 is connected through the annular groove 151 of the valve plunger 152 to a line 153 connected to the progression selector valve 92 and through the annular groove 120 of its valve stem 94 to the line 122 of the hydraulic motor 106. Opposing this, is pressure derived from the hydraulic pump 77 through the line 80 and the branch line 80f which is connected through a hydraulic resistance 154 to a line 155 connected to a control valve 156 in the tracer housing 47a having a plunger 157 normally urged toward the disc cam 125 by a compression spring 157a to stop rotation of the motor 106. The valve plunger 157 is pushed outwardly at this time by the cam point 159 of the disc cam 125, Figure 4, so as to position the annular groove 158 to connect fluid pressure from the line 155 to a line 160 which, in turn, is connected to the control valve 143 having its plunger 142 so positioned by the detent notch 139 in the cam 125 that its annular groove 161 permits connection of the line 160 to a line 162 which is connected through a line 163 to a pilot control valve 164. This pilot control valve 164 has a plunger 165 which is normally urged in one direction, by a compression spring 166, so that the line 163 is normally closed off at the annular groove 167. A branch line 163a connected to the line 163 and to the motor reversing valve 150 communicates at this time through the annular groove 168 of valve plunger 152 of valve 150 with the line 169 which is connected to the progression selector valve 92 and through the annular groove 119 of its plunger 94 with the line 121 of the tracer head motor 106 so that in this way fluid pressure is maintained simultaneously in both the lines 121 and 122 of the motor 106 to prevent its rotation during the longitudinal feeding movement. A branch line 163b of the line 163 is also connected to the valve 150 and at this time is blocked off at the valve by its plunger 152. A third branch line 163c connected to the line 162 and 163 and also connected to the valve 170 in the tracer housing 47a is at this time closed off at the annular groove 171 of the valve plunger 172 of this valve 170, the plunger 172 being moved outwardly by the cam point 173 of the disc cam 125.

In order to compensate for leakage during the simultaneous application of pressure in the lines 121 and 122, there is also provided a supplemental supply line 174 connected to the pressure line 80 and through a hydraulic resistance 175 and a line 176 to the line 163c so that when the motor is stopped fluid pressure will slowly bleed through the resistance 175 to make up any leakage in the motor and associated hydraulic system to keep the motor lines always fully supplied with hydraulic fluid.

The longitudinal feeding movement continues in the direction of the line 56, Figure 10, with the tracer 48 moving freely in space in undeflected condition until it engages the surface 53a of the template at the point 57. The tracer is then deflected to prevent escape of pressure to drain line 95a at the annular groove 95e and to connect this pressure through the annular groove 97 in the valve plunger 96 to the line 98, and thus through an annular groove 177 of the valve plunger 94 of the progression selector valve 92 which is now in communication with a line 178 having one branch line 178a going to a pressure port 179 of the control valve 156. Another branch line 178b is connected to the control valve 143 which at this time is closed off by the plunger 142 of the control valve 143.

Referring more particularly to Figure 4, the valve plunger 157 of the valve 156 is here shown held outwardly by cam point 159 of the disc cam 125 so that the spool 181 of the plunger 157 is positioned relative to the port 179 so that pressure from the line 178a will enter the annular groove 182 formed in the valve plunger 157 and pass around the spool 180 into annular groove 183 of the valve 156 and out through a line 184 which is connected to the pressure chamber 185, Figure 16, of the motor reversing valve 150 to thereby shift the plunger 152 of the valve 150 axially to its other position, upwardly in Figure 16. While so shifting, the plunger 152 displaces fluid out of chamber 186 through discharge line 187, annular grooves 188 and 190 in the control valve 156, into the drain lines 95f and 95 for return of fluid to the reservoir 78.

As the valve plunger 152 of the motor reversing valve 150 stalls at the other end of its stroke, pressure builds up in the pressure chamber 185 and in the line 187 connected thereto. This pressure is connected through line 190 to the pressure chamber 191 behind the valve plunger 165 of the pilot control valve 164, shifting the plunger 165 against the compression spring 166 to cause its annular groove 167 to connect lines 163b and 163 to the drain line 95j and associated drain line 95. This action permits discharge from the tracer head motor 106 through the line 122, the annular groove 120 in the progression selector valve 92, line 153, annular groove 151 of the plunger 152, to the line 163b, permitting pressure coming in through the line 121 to rotate the motor 106. At this time the line 163a connected to the line 163 is closed off by the valve plunger 152 of the motor reversing valve 150.

The pressure built up in chamber 185 of the motor reversing valve and line 184 connected to it, receiving pressure from the line 178a through the valve 156, produces pressure in the annular groove 183 formed in the valve 156 which is distributed to the annular groove 182, Figure 4, formed by the valve spools 180 and 181 of the plunger 157, and to the annular groove 192 by the spool 180 and a smaller spool 193 operating in a reduced bore 194 formed in the valve 156. The valve spool 180 is of such width that when positioned by the cam point 159, as shown in Figure 4, there will be free passage for the fluid around the spool 180 through the annular groove 183 in the valve body 156. Thus, the fluid pressure in the chamber formed by the annular groove 182 and 192 will exert a pressure in one direction against the face of the spool 181 and against the face of the smaller spool 193 resulting in a differential axial pressure being applied to the valve plunger 157 which will hold or hydraulically latch the valve plunger against the pressure of the spring 157a in a direction away from the disc cam 125. In other words, referring to Figure 4, the plunger 157 when moved to the position indicated by the cam point 159 will remain in that position by hydraulic differential latching pressure between the spools 181 and 193 as applied through the line 178a and port 179 to hold this valve latched in the position shown after the cam point 159 has again rotated away from the valve plunger 157 and will remain in this latched position so long as the pressure is maintained in the annular grooves 182 and 192.

Each of the other valves 143 and 170 associated with the disc cam 125 is also provided with hydraulic latching means. This consists of a source of pressure supply received through a branch line 80j of pressure line 80 connected to a latching control valve 195 having a plunger 196 normally urged in one direction by compression spring 197 so that the annular groove 198 of the valve plunger 196 normally connects pressure from the line 80j to a pressure supply line 199 having one branch line 199a connected to the valve 143 and the other branch line 199b connected to the valve 170. The valve 143, Figure 4, has a pressure port 200 to which the line 199a is connected and a drain or exhaust port 201 connected through a suitable drain line 95k to the drain line 95 for return of fluid to the reservoir 78. Whenever the valve plunger 142 is moved outwardly against its compression spring by either of the cam points 159 or 173 the pressure port 200 is opened to a differential annular groove 202 formed by a large spool 203 and a smaller spool 204 of the valve plunger 142, while the drain port 201 is closed whenever the pressure port 200 is opened to the annular groove 202, as shown in Figure 6. Thus, whenever pressure is applied to the annular groove 202 the differential areas between the spools 203 and 204 will normally cause the valve plunger 142 to be hydraulically latched in outward position away from the disc cam 125 as shown in Figure 6.

Similarly, in the valve 170 the pressure line 199b is connected to a pressure port 205 which communicates with a differential annular groove 206 formed by a large spool 207 and a smaller spool 208 of the valve plunger 172. A drain port 209 is connected through a drain line 95i to the drain line 95 for return of fluid to the reservoir 78. These ports are alternately connectable to the differential annular groove 206 in such a way that whenever the plunger 172 is moved outwardly against its compression spring 172a to connect the pressure port 205 to the annular groove 206 the plunger will be latched in outward position by hydraulic pressure. Both valves 143 and 170 will remain in such position so long as pressure is maintained in the line 199, 199a, and 199b from the valve 195.

The pilot control valve 164 has a second annular groove 210 in addition to the annular groove 161 so arranged that when the valve 161 is in its normal position under the influence of the compression spring 166 the return lines 81 and 82 from the saddle and table actuating cylinders 25 and 38 respectively are connected through the tracer selector valve 83 to the line 91, through the annular groove 93 in the progression selector valve 92 to the line 211 connected to the pilot control valve 164, and then through its annular groove 210 out through a line 212 and a branch line 213 to the valve 156 and through annular groove 214 provided in its valve plunger 157 to a drain line 95g connected to the drain line 95 for return of fluid to the reservoir 78 when the valve plunger 157 is moved outwardly away from the disc cam 125 by the cam points 159 or 173. Whenever fluid pressure is applied to actuate the pilot control valve 164 against the compression spring 166 the line 211 will be blocked off at this valve 164 to thereby prevent operation of the feeding movement of the saddle and table cylinders 25 and 38. Thus, the operation of the valve 164 when in normal position under the influence of the compression spring 166 is to block the motor return line 122 to prevent rotation of the tracer head rotating motor 106 while permitting the saddle and table cylinders to effect feeding motions, and when the valve 164 is moved against its compression spring 166 by fluid pressure in its pressure chamber 191 the return line from the hydraulic tracer rotating motor 106 will be opened as described to the drain line 95j while at the same time closing off the line 211 from the feeding cylinders to thus permit rotation of the tracer head while arresting the feeding motion.

With the machine set for automatic progression, with the tracer selector valve in "hand" position and the progression selector valve in "in" position, whenever the tracer 48 is undeflected the valve 164 is in its normal position, shown in Figure 16, permitting the saddle and table cylinders to feed while preventing rotation of the tracer rotating motor. Whenever the tracer is deflected by engagement with the profile pattern at the end of a longitudinal feeding stroke the pilot valve 164 will be moved against its compression spring 166 by fluid pressure in chamber 191 to arrest the saddle and table feeding movements while initiating rotation of the tracer head by the hydraulic motor.

There has thus been provided a tracer operated pilot control valve constituting a mechanism for alternately instituting a feeding motion or a change in direction of the feeding motion. The tracer further operates as a trip control member or device engageable with the profile pattern to provide the sole means for arresting the feeding movement and initiating a change in direction for the feeding movement between the cutting tool and the work.

When the tracer 48 engages the profile pattern at the point 57, Figure 10, and becomes deflected starting rotation of the profile tracer rotating motor 106, the tracer head 47 and the synchronously rotatable disc cam 125 connected thereto begin to rotate in a clockwise direction, Figures 4 and 16. As a result, the cam point 159 of the disc cam 125 moves away from the plunger 157 of the valve 156, Figure 4, but the valve plunger 157 remains in its outer position by the hydraulic latching pressure coming in through the line 178a until the tracer again becomes undeflected as described. Valve plunger 142 of the valve 143 at this time rides out of the detent notch 139, which does not move the plunger sufficiently far outwardly to cause the fluid pressure in the pressure port 200 to effect hydraulic latching of the valve plunger 142 or otherwise change the fluid connections to the valve so that the plunger remains unlatched and moves toward the disc cam 125 by its spring 141 after it leaves the detent notch 139, assuming the unlatched position shown in Figures 4 and 7. The valve plunger 172 of the valve 170 has been pushed outwardly by the cam point 173 so that it is latched up at this time by pressure in the pressure port 205. Thus, as the cam point 173 moves out from under the valve plunger 172 the plunger will remain in the latched up position shown in Figures 4, 6 and 7.

As the tracer head, and disc cam continue to rotate, the tracer becomes undeflected by being rotated away from the obstructing surface of the profile pattern so that it ultimately returns to its undeflected position which disconnects pressure from the line 178a and connects this line to drain line 95a to allow valve plunger 157 of the valve 156 to become unlatched and move toward the disc cam 125, under the influence of the spring 157a, to the position shown in Figure 6. It is to be noted, Figure 6, that whenever the valve plunger 157 of the valve 156 is in unlatched position, the pressure supply line 178a will be closed off at the annular groove 229 in the plunger 157. At the same time the respective pressure chambers 185 and 186 for actuating the motor reversing valve 150 have their respective lines blocked off at the respective annular grooves 183 and 188 of the valve 156 so that when the valve 156 is unlatched the valve plunger 152 of valve 150 may not be shifted.

When pressure in line 178a is cut off by return of the tracer 48 to undeflected position, the pilot control valve 164 is positioned in its normal position shown in Figure 16 and held therein by its spring 166 since pressure from the line 98 and the associated line 178b which may be connected through the annular groove 178c of valve plunger 142 of valve 143 to the line 178d connected to the pressure chamber 191 of the pilot control valve 164, is cut off at this time at the unlatched plunger 142 of the valve 143. This positioning of the pilot valve 164 would normally stop rotation of the tracer motor 106. However, its return line 122 is now connected through the annular groove 120 in the progression selector valve 92 to the line 153 and through the annular groove 151 in the valve plunger 152 of the motor reversing valve 150 to the line 163b and the line 163 to the line 162 connected to the control valve 143. With the control valve plunger 142 in the unlatched position the line 162 is connected through its annular groove 161 to the line 160 connected to the control valve 156, which valve is now in the unlatched position due to the tracer being undeflected and connects the line 160 through annular groove 158 of the plunger 157 to the drain line 95f and the drain line 95 for return of fluid to the reservoir 78 to permit continued rotation of the motor 106. The line 163c at this time is blocked at the annular groove 171 of the valve plunger 172 of the valve 170 since it is in latched up position as described.

The rotation of the tracer head 48a and the disc cam 125 continues through 90° of rotation until the cam point 159 engages the plunger 142 of control valve 143 which moves the plunger outwardly to block off the line 162 carrying the return flow from the hydraulic motor 106 at the valve 143 to thus stop rotation of the motor 106. Since the valve plunger 172 in the valve 170 is still latched up it continues to block off the line 163c connected to the line 162 and 163 so that there is no escape of fluid therethrough to prevent the stopping of the motor 106. Also, the plunger 157 of the valve 156, which is now unlatched, rides into the detent notch 140 as shown in Figure 6 so as to effect a positioning of the disc cam 125 and tracer head in the 90° rotated position preparatory to the cross indexing movement.

At this time the return lines 81 and 82 from the saddle and table feeding cylinders are connected through the tracer selector valve 83 to the line 91 and through the progression selector valve 92 to the line 211 which is connected to the pilot control valve 164 which at this time is in its normal position under the influence of its spring 166 so as to connect the line 211 through the annular groove 210 to the line 212 to which is connected a line 212a connected to the motor reversing valve 150. At this time this valve has its plunger 152 so positioned that its annular groove 214 connects the line 212a to a line 215 which, in turn, is connected to one side of a metering or progression cross indexing movement cylinder 216, Figures 15 and 16. This metering cylinder 216 has a freely moving piston 217 slidably mounted in its bore 218 of the cylinder 216 so as to form a chamber on one side thereof to which is connected the line 215 and a chamber on the other side thereof to which is connected a line 219. The object of this cylinder is to provide an arrangement for metering or permitting a predetermined volume of fluid to flow into the cylinder either through the line 215 or the line 219 before the flow is positively arrested by the stopping of the piston 217 at the end of its stroke of travel in the cylinder bore 218.

The extent of back and forth travel of the piston 217 may be varied to suit the volume of oil it is desired to permit the lines 215 and 219 to discharge into the cylinder 216. This comprises an adjustable abutment screw 220 appropriately mounted in a threaded nut 221 fixed to the cylinder housing 216 by a suitable bracket 222 and which screw may be rotated by a suitable hand wheel 223 having an indicating strip or dial 224 appropriately graduated for indicating the amount of each cross indexing movement the operator may select for the automatic progression operation. Thus, as the discharge from the table and saddle cylinders begins to enter the metering cylinder 216 through the line 215 as described the piston 217, which at this time is against the end 220a of the abutment screw 220, will move away from the screw 220 to the opposite end of the cylinder 216 until it engages the positive abutment surface 220b and comes to a stop so that no further fluid may enter the cylinder bore 218 from the line 215. Discharge through the line 219 passes through the annular groove 234 of the reversing valve 150 which at this time is connected to the line 234a and through a hydraulic resistance 234b to the drain line 95j. When fluid is being discharged out of the metering cylinder 216 through the line 215, the valve plunger 152 of the motor reversing valve is so positioned that the line 215 is connected through the annular groove 214 to the line 234c and the resistance 234b to the drain line 95j, in both cases the fluid resistance serving to control the movement of the metering cylinder piston 217. By thus volumetrically metering the discharge from the table and saddle cylinders the amount or distance of cross indexing progression movement may be accurately obtained independent of the feed rate setting for these cylinders as determined by the setting of the tracer head eccentric 72.

By rotating the hand wheel 223 the graduations on the scale 224, arranged to move axially with the screw 220 indicates the amount of cross travel in inches. When cross indexing movements are being obtained by table movement the scale figures 224 are utilized in connection with the reference line 225, provided on the cylinder 216 whereas when the cross indexing movements are to be effected in the vertical direction the reference figures 224b are utilized in connection with the reference line 226. The different scales are required because the table cylinder 37 is usually of larger diameter than the vertical saddle cylinder 24 and therefore the volumetric displacement for a given amount of cross indexing movement will vary in accordance with the cylinder sizes, this being automatically taken care of by the multiple scales 224a and 224b. When, for example, automatic progression is to be effected at an angle as in the case of the work surface W—2, Figure 11, the amount of cross indexing movement may be readily selected by utilizing a setting somewhere between the two scale readings shown on the scale 224.

Discharge from the table and saddle cylinders finally moves the metering cylinder piston 217 up against the abutment 220b by discharging fluid through the line 215 through motor reversing valve into the drain line 95j as described. Thus piston 211 stops causing pressure to immediately build up in the cylinder and in the line 215, and through the annular groove 214 of valve plunger 152 of valve 150, in the line 212a, the line 212, and the line 213 which is connected to the valve 156 and is at this time closed off from the drain line 95g at the annular groove 214 by the plunger 157 since it is in unlatched position as shown in Figure 6. This pressure in the line 213 and 212 is also transmitted through a branch line 227 connected to a pressure chamber 228 of the latching control valve 195 which causes its plunger 196 to be depressed against the spring 197 so as to close off pressure from the pressure supply line 80j while at the same time connecting the lines 199, 199a and 199b for the hydraulic latching mechanism of the respective valves 143 and 170 to a drain line 95k to thus release the latching pressure in the valves 143 and 170 and permit them to unlatch and move radially toward the disc cam 125.

The unlatching of the valve 170 by the control valve 195 connects the line 163c, carrying the return flow from the hydraulic tracer motor 106, through the annular groove 171 of the plunger 172 to the drain line 95h connected to the drain line 95 to thus again initiate rotation of the hydraulic tracer motor 106, the tracer head 47, and the disc cam 125 to thus stop the cross indexing movement and cause a change in direction of the tracer head 48a. Discharge from the motor 106 is then also conducted from the line 163 through the line 162, the annular groove 161 in the valve plunger 142 of the valve 143 out through the line 160 to the control valve 156 and through the annular groove 158 of its valve plunger 157 to the drain line 95f connected to the drain line 95 after cam point 159 rotates out from under the plunger 142 of the valve 143. Rotation of tracer head and disc cam 125 then continues for another 90° of rotation until the cam point 173 of the disc cam 125 arrives at the position shown in Figure 7 to again move the plunger 157 of the valve 156 outwardly against the spring 157a. As a result, pressure in the line 227 holding down the valve plunger 196 of valve 195 is relieved by discharge through the line 213 through the annular groove 214 of the valve plunger 157 of the valve 156 to the drain line 95g connected to the drain line 95, thus again reestablishing the latching pressure in the lines 199a and 199b of the respective control valves 143 and 170. Movement of the control valve plunger 157 to its outward position by the cam point 173 closes off the drain line 95f from connection with the line 160, Figure 7, carrying return flow from the hydraulic tracer rotating motor 106 so as to arrest the rotation of the motor. The annular groove 158 connects the line 160 to the pressure line 155 so as to again apply pressure to the motor return line 122 to stop the motor. The line 213 is at the same time connected to the drain line 95g by the valve 156 so as to reestablish the longitudinal feeding movement.

The valve 170 has its plunger 172 moved outwardly by the cam point 159 which causes it to latch in its outward position so as to close off the line 163c at its annular groove 171 to prevent fluid from escaping to drain line 95h from the motor return line 122 and associated connecting lines to the line 163c as described.

It is to be noted that the cam point 173 of the disc cam 125 does not project radially as far outwardly as the cam point 159 so that the control valve plunger 157 is not moved as far radially outwardly by the cam point 173 as the cam point 159. As a result when the cam point 173 is controlling the outward position of the plunger 157, Figure 7, pressure from the line 178a is connected into the annular groove 229 formed in the valve plunger 157 by the spool 181 and the spool 189 through the annular groove 188 in the valve body 156 and then into the line 187 connected to the pressure chamber 186 of the motor reversing valve 150 to cause its plunger to shift the opposite direction to the position shown in Figure 16. At this time fluid is discharged out of the pressure chamber 185 of the valve 150 through the line 184 to the annular groove 183 in the valve 156 and then through the annular groove 192 of the valve plunger 157 and into the drain line 95l, which is now opened to the annular groove 192 due to the lower cam point 173 which was not the case when the high cam point 159 held the valve in the position shown in Figure 4.

Thus, the valve plunger 152 of the motor reversing valve 150 is shifted to the position shown in Figure 16 the next time the tracer is deflected to reverse the connections to the profile tracer motor 106 for counterclockwise rotation of the tracer head since now pressure from the line 80h passing through the annular groove 151 of the valve plunger 152 may enter the line 153 and through the annular groove 120 of the valve plunger 94 of the valve 92 comes into the line 122 connected to the hydraulic tracer rotating motor 106, the line 121 then becoming the motor return or drain line connected through the annular groove 119 of valve plunger 94 to the line 169 which is connected through the annular groove 168 of the plunger 152 of the valve 150 to the line 163a and into the line 163 connected to the pilot control valve 164. Thus, when the pressure in the chamber 186 of the valve 150 builds up after shifting its plunger 152 to the position shown in Figure 16, it will discharge out through the line 231 into the line 190 to the pressure chamber 191 of the valve 164 to shift it downwardly and permit the return flow from the hydraulic motor 106 through the line 163a and line 163 to pass through the annular groove 167 of the valve plunger 165 to the drain line 95j to thus again start rotation of the hydraulic motor 106 in the opposite direction. The cycle and sequence of valve operation of the various control valves will take place as described except that now the disc cam 125 will rotate in the opposite or counterclockwise direction of rotation. Thus, when the tracer again engages the profile pattern the cycle just described will be successively repeated until the work surface to be machined has been entirely scanned by the automatic progression movement.

When the back and forth longitudinal feeding movement terminates at each end by engagement of the tracer 48 with converging surfaces of the profile pattern, such as at the point 63 in Figure 10, it is obvious that it is necessary to rotate the tracer head more than 90° before instituting the cross indexing movement or else this cross indexing movement would gouge in beyond the desired profile 53 of the work surface to be machined. In such instances the tracer, of course, will remain deflected even after the tracer head has been rotated through the initial 90°, so that pressure will continue to be applied by the line 178b through the latched up valve 143 which is engaged by either cam point 159 or 173 after 90° of rotation and the line 178d to maintain the valve plunger 165 of the pilot control valve 164 depressed against its spring 166 so as to continue rotation of the hydraulic tracer rotating motor 106 even after 90° of initial rotation have been completed. This rotation will continue beyond 90° with the valve 164 depressed until the tracer 48 finally becomes undeflected by being rotated sufficiently away from the converging portion 63 of the profile pattern. When the tracer is finally undeflected pressure from lines 98, 178 and 178b through valve 143 is removed and is connected to the drain line 95a by the profile tracer valve. This permits the return of the valve 164 to its normal position under the influence of the spring 166 when the tracer 48 becomes undeflected to now start the cross indexing movement of the table and saddle cylinders at an angle, represented by the line 65, Figure 10, while arresting rotation of the tracer rotating motor 106. The angular cross indexing movement continues a distance as determined by the setting of the metering cylinder 216 and upon completion of the movement of the piston 217 of the metering cylinder the fluid pressure rise causes actuation of the valve 195 to take place which unlatches the valve 143 to permit the final amount of rotation of the motor 106 to the total of 180° of rotation preparatory to initiating again the longitudinal feeding movement of the tracer in the opposite direction along the line 67, Figure 10. This arrangement is so designed that should the tracer meet an obstruction and become deflected in traveling along the angular path of cross indexing movement 65, it would be momentarily stopped while the tracer head would be rotated away from the obstruction by the motor 106 and as soon as the tracer again became undeflected by this rotation, the motor would be stopped and the feeding again restarted so that there is no possibility of the tracer and cutter overtraveling the desired profile surface 53 of the work under any irregular condition of its work surface when initiating reversal of the longitudinal feeding movement against converging or reentrant surfaces, such as at 63 in Figure 10.

With this arrangement it is obvious that the length of cross indexing movement, whether effected perpendicular along the line 58 or in an angularly related direction along the line 65, as indicated in Figure 10, will be the same and determined by the setting of the adjusting screw 220 of the metering cylinder 216. Thus in the automatic operation of the machine to completely scan work surfaces such, as shown in Figure 11, the machine may be set in operation and will thenceforth automatically complete the scanning of the entire area of each work surface without attention upon the part of the operator. It will be noted that when worknig or converging surfaces with acute angular relationship to the direction of longitudinal feeding movement as indicated at 65 in Figure 10, there will be a tendency to decrease the actual cross indexing movement so as to cause the longitudinal feeding lines of movement to be somewhat closer together in automatically working between angular converging surfaces, as indicated in Figure 11. This is ordinarily not objectionable but if it is desired to maintain a substantially uniform cross indexing motion in the interest of maximum production it is merely necessary for the operator to appropriately adjust the hand wheel 223, Figure 15, of the metering cylinder 216 to increase the length of cross indexing movement along the line 65 when the converging surfaces are approached during the automatic progression movement to maintain a substantially uniform actual spacing between each longitudinal path of feeding.

When it is desired to operate the machine having the automatic progression control mechanism described for normal manual tracer control movements or for conventional profile or three-dimensional automatic control operations it is preferable to eliminate automatically the operation of the various control devices and control valves not being utilized during the normal operation of the machine. This also minimizes wear by needless operation of parts not required to effect the desired machine operation and also increases the sensitivity of those parts actually being utilized. More specifically, the operation of the control valves 143, 156, and 172 which are actuated by the disc cam 125 is automatically eliminated during normal automatic profiling or tracing operations. This also avoids the tendency of the valves to restrict freedom of rotary movement of the tracer head.

In order to accomplish this, the progression selector valve 92 is so arranged that when moved to its "out" position 92a the pressure line 80k connected to the main pressure line 80 from the hydraulic pump 77, and which is normally closed off at the annular groove 236 of the valve plunger 94, is connected through the annular groove 177 to the line 178 having the branch line 178a which maintains pressure in the latching arrangement of the valve 156 when its plunger 157 is moved outwardly by the high point 159 of the disc cam 125 as described. Also, at the same time pressure is maintained in the latching means for the valves 143 and 170 through the line 80j of the pressure line 80 as described so that when the machine is to be put in manual or normal automatic profile tracing operation and the progression selector valve is positioned in the out position 92a, merely by rotating the hand wheel 96a or by rotating the tracer head under power operation by the motor 106 as when tripping the tracer selector valve 83 from "hand" to "automatic" as described, the cam point 159 rotates around and strikes the various valve plungers 157, 142, and 172 to cause them all to be latched up out of the way of the disc cam 125 so that thereafter this disc cam and the tracer head may be freely rotatable without actuation of the valve plungers of these valves and cooperating control valves and metering cylinder described. Thus, whenever the operator cuts out the automatic progression cycle by appropriately manipulating the progression selector valve the automatic progression control mechanism is automatically rendered inoperative.

As a safety feature in connection with this mechanism there is provided a supplemental control valve 232 which is actuated by overdeflection of the tracer 48 as might occur in running into an obstruction, so as to connect pressure from the line 80m connected to the main pressure line 80 which supplies pressure to the annular groove 233 formed in the valve 232. When the tracer 48 is overdeflected the valve 232 to the line 234 is moved to connect fluid pressure through line 234 to the pressure operating chamber 235 of the progression selector valve 92 to shift valve plunger 94 to the "out" position 92a. The line 98 from the tracer control valve 47 which is supplied by pressure from the line 80d when the tracer 48 is overdeflected now becomes connected through the annular groove 99 of the valve plunger 94 to a line 100 connected to the pressure chamber 101 which moves the tracer selector valve 83 to the automatic position to stop the feeding motion of the table and saddle cylinders and cause rotation of the tracer head to overcome the overdeflection of the tracer 48 and to thereby protect the machine operation when set in any of its operating cycles.

There has thus been provided in a pattern controlled milling machine an arrangement capable of automatically scanning in an automatic progression machining operation an entire three-dimensional work surface without attention upon the part of the operator.

There has also been provided in such a machine an arrangement whereby the cross indexing movement of the automatic progression operation may be radially effected in any angular direction by the mere adjustment of control devices of the machine without in any way altering the position of the work piece in the machine or changing the general set-up of the machine structure.

There has also been provided in a pattern controlled milling machine capable of automatically scanning three-dimensional work surfaces of irregular profile, an arrangement permitting automatic reversal of the scanning movement in connection with converging surfaces which automatically accurately accommodates itself to any irregular configuration of the profile of the work piece without attention upon the part of the operator.

What is claimed is:

1. In a pattern controlled milling machine having a pair of relatively movable slides, fluid pressure actuating means for said slides, a work piece and pattern mounted on one of said slides and a cutter and tracer mounted on the other of said slides, and directional control means in connection with said tracer for effecting the simultaneous operation of said slides by said fluid pressure actuating means to determine the resultant direction of movement of the work and cutter, the combination of fluid pressure control means to effect orientation of said directional control means to a predetermined position to effect a relative longitudinal feeding movement between said cutter and work piece, and further fluid pressure control means rendered operative by the engagement of said tracer with said pattern during said longitudinal feeding movement to effect a relative cross indexing movement of cutter and work piece normal to said longitudinal feeding movement.

2. In an automatic die sinking machine having a pair of relatively movable members, fluid pressure actuating means for said members, a work piece and pattern mounted on one of said members and a cutter and tracer mounted on the other of said members, directional control means in connection with said tracer for effecting the simultaneous operation of said members by said fluid pressure actuating means to determine the resultant direction of movement of the work and cutter, the combination of a fluid pressure control means to effect orientation of the directional control means in a predetermined direction of longitudinal feeding movement, further fluid pressure control means rendered operable by the engagement of said tracer with said pattern during said longitudinal feeding movement to cause a cross indexing movement normal to said longitudinal feeding movement, and means independent of the rate of longitudinal feeding movement to cause said cross indexing movement to take place for a predetermined definite distance for each engagement of said tracer with said profile pattern.

3. In a pattern controlled milling machine adapted to perform an automatic progression operation on a work piece, the combination of a tracer and cutter movable relative to a pattern and work piece, means operative to cause reversible longitudinal feeding movements of the tracer and cutter relative to the pattern and work, means rendered operative by the engagement of the tracer with the pattern to cause a cross indexing movement normal to said longitudinal feeding movements when said cross indexing movement is taking place in a direction away from the surface of the pattern at the point of engagement of the tracer therewith, and further means to cause a cross indexing movement in a direction substantially parallel to the profile pattern surface engaged by the tracer when said cross indexing motion is taking place toward the surface of said pattern at the point of engagement of the tracer therewith.

4. In a pattern controlled milling machine adapted to perform an automatic progression operation on a work piece, the combination of a tracer and cutter movable relative to a pattern and work piece, means operative to cause reversible longitudinal feeding movements of the tracer and cutter relative to the pattern and work, means rendered operative by the engagement of the tracer with the pattern to cause a cross indexing movement normal to said longitudinal feeding movements when said cross indexing movement is taking place in a direction away from the surface of the pattern at the point of engagement of the tracer therewith, further means to cause a cross indexing movement in a direction substantially parallel to the profile pattern surface engaged by the tracer when said cross indexing motion is taking place toward the surface of said pattern at the point of engagement of the tracer therewith, and means for maintaining a substantially constant amount of cross indexing movement, independent of the rate of said longitudinal feeding movement, for any configuration of the profile pattern being scanned.

5. In a pattern controlled milling machine adapted to perform an automatic progression operation on a work piece, the combination of a tracer and cutter movable relative to a pattern and work piece, means operative to cause reversible longitudinal feeding movements of the tracer and cutter relative to the pattern and work, means rendered operative by the engagement of the tracer with the pattern to cause a cross indexing movement normal to said longitudinal feeding movements when said cross indexing movement is taking place in a direction away from the surface of the pattern at the point of engagement of the tracer therewith, further means to cause a cross indexing movement in a direction substantially parallel to the profile pattern surface engaged by the tracer when said cross indexing motion is taking place toward the surface of said pattern at the point of engagement of the tracer therewith, and means for maintaining a substantially constant amount of cross indexing movement independent of the rate of said longitudinal feeding movement for any configuration of the profile pattern being scanned, including means for adjusting the amount of cross indexing movement during the continuous automatic operation of the automatic progression operation to maintain a substantially constant amount of cross indexing movement normal to said direction of longitudinal feeding movement.

6. In a pattern controlled milling machine having a cutter and a tracer head movable relative to a work piece and pattern, and means for effecting an automatic progression machining cycle between said cutter and work piece comprising fluid pressure operating means for circumferentially orienting said tracer head in a predetermined direction of longitudinal relative feeding movement of cutter and work piece, fluid pressure control means rendered operative by engagement of said tracer head by said pattern to arrest said longitudinal feeding movement and reorient said tracer head to cause relative cross indexing movement of said cutter and work, said last-mentioned means including means for the circumferential orientation of said tracer head by operation thereof by a reentrant surface of said pattern during longitudinal feeding movement to maintain the cross indexing movement at all times within the confines of the work surface to be machined.

7. In an automatic pattern controlled machine tool having a pair of actuable slides, fluid operable means for actuating said slides, a common rotatable rate and direction control member associated with said fluid operable means for controlling the rate and resultant direction of simultaneous operation of said slides, fluid pressure means for changing the effective direction of said common rate and direction control member, a trip operated control means actuated by engagement with a pattern of said machine to arrest movement of said slides, and cause a change in effective direction of said rate and direction control member, and means rendered operative by the disengagement of said trip control means from said pattern to cause movement of said slides when said rate and direction control member is positioned in a predetermined effective direction.

8. In a pattern controlled milling machine having a pair of fluid operable slides, a common rate and directional control member rotatable to determine the direction of resultant movement of simultaneous operation of said slides, fluid pressure actuating means for rotating said common member, a cam operated fluid pressure control device synchronously rotatable with said common member, a tracer operable when deflected by engagement with a control pattern in said machine to render said fluid pressure means for rotating said common member operative, means whereby said cam operated fluid pressure control device effects rotation of said common member to a predetermined position, fluid pressure control means operable to cause a predetermined distance of relative travel of said slides independent of the rate of the resultant movement of said slides when said common member has been rotated to a predetermined position, and further fluid pressure control means operable by said cam operated fluid pressure control device to effect further rotation of said common member to another predetermined position to again institute movement of said slides.

9. In a pattern controlled milling machine having a 360° profile tracer head having a tracer adapted upon deflection to cause rotation of said head for changing the effective direction of relative movement of a cutter and work piece of the machine and to arrest said rotation and cause relative movement of the cutter and work when undeflected, the combination of an auxiliary hydraulic control means adapted to maintain said tracer head in a predetermined effective direction of relative movement of cutter when undeflected to effect longitudinal feeding movement of cutter and work, means rendered effective by the deflection of said tracer during said longitudinal feeding movement to cause said tracer to rotate to an effective direction substantially perpendicular to said longitudinal feeding movement and to institute movement of cutter and work in said perpendicular direction for a predetermined distance independent of the rate of said relative longitudinal feeding movement, and means operable independent of the movement of said tracer to cause further rotation of said tracer head to reverse the direction of longitudinal feeding movement after said cross indexing movement has been completed.

10. In a hydraulic control system for a pattern controlled milling machine arranged to perform profiling operations or automatic progression operations by relative movement of work and tool therein, a rotatable 360° profile tracer head having a tracer adapted to engage a pattern, fluid pressure means for rotating said tracer head to predetermined circumferential positions for determining the direction of relative movement of work and tool, a control tracer mechanism operable for selecting profiling or progression operations for the machine including a series of sequentially operated control valves actuated by the rotation of said tracer head arranged to effect the orientation of said tracer head in predetermined directional positions, and fluid pressure latching means associated with said control valves operable to determine the sequential operation of said control valves.

11. In a hydraulic control system for a pattern controlled milling machine arranged to perform profiling operations or automatic progression operations by relative movement of work and tool therein, a rotatable 360° profile tracer head having a tracer adapted to engage a pattern, fluid pressure means for rotating said tracer head to predetermined circumferential positions for determining the direction of relative movement of work and tool, a control tracer mechanism operable for selecting profiling or progression operations for the machine including a series of sequentially operated control valves actuated by the rotation of said tracer head arranged to effect the orientation of said tracer head in predetermined directional positions, and fluid pressure latching means associated with said control valves operable to determine the sequential operation of said control valves, and means rendered operative by said control tracer mechanism whereby said latching means renders said control valves inoperative when the machine is adjusted for profile operations.

12. In a hydraulic control system for a pattern controlled milling machine capable of performing automatic progression scanning operations on a work piece having a rotatable 360° profile tracer head including a tracer for controlling the relative movement of work and tool and the direction of said movement, a control valve operable for selecting manual directional control of said tracer head or for selecting power directional control therefor for automatic profiling operations and a progression selector control mechanism including a selector valve operable to adjust said machine for manual and automatic profile operations or for automatic progression operations, cooperating fluid pressure control means comprising a series of sequentially operated control valves, actuated by a control cam rotatable synchronously with said tracer head, a reversing means for changing the direction of rotation of said tracer head, a pilot control valve operable by the deflection of said tracer to alternately cause relative movement of work and tool or a change in effective direction of said relative movement, and a fluid pressure metering device for accurately determining the distance of relative movement of work and tool when said tracer head is positioned in predetermined directions of effective relative movement of work and tool.

13. In a pattern controlled milling machine adapted to perform automatic progression machining operations on a work piece, a 360° rotatable profile tracer head, a fluid pressure motor for rotating said tracer, fluid pressure actuating means for effecting relative feeding movement of work and tool in said machine, a fluid pressure control means operable by the deflection and undeflection of said tracer for alternately effecting said relative feeding of work and tool or the rotation of said tracer head during automatic progression machining operations including the combination of a series of sequentially operated control valves, a disc cam rotatable for actuating said valves in predetermined sequential relationship, means for rotating said cam and tracer head in synchronism, and adjustable clutch means interconnecting said cam and tracer head for reorienting said cam relative to said tracer head to effect any angular direction of automatic progression movements.

14. In a fluid pressure power circuit for a pattern controlled milling machine having a 360° profile tracer head including a tracer for controlling the direction and rate of relative movement of work and tool in the machine, a tracer selector valve for adjusting the tracer head for profiling operation of the machine, a manually operable progression selector valve, a hydraulic control means rendered operative by said progression selector valve for setting up an automatic progression operation of the machine including the combination of a series of sequentially operated control valves actuated by the direction of movement of said tracer head, a reversing valve actuated by said sequentially operated valves for directionally positioning said tracer head, a pilot valve operable by the deflection of said tracer for controlling the direction and relative movement in said direction of work and tool, a fluid metering device controlling the distance of relative movement of work and tool for certain predetermined directional positions of said tracer head and a latching control valve rendered operative by said fluid metering device for modifying the operation of said sequentially controlled valves during their operation by the direction of movement of said tracer head.

15. In a pattern controlled milling machine having a fluid pressure actuating circuit for effecting an automatic progression machining operation between work and tool therein, the combination of a tracer head having a tracer, means for rotating said tracer head to determine the direction of relative movement of work and tool, means associated with said tracer head for determining the rate of said relative movement, a series of control valves actuated in a predetermined sequence by the rotation of said tracer, a reversing valve for changing the direction of the means for rotating said tracer head, a pilot control valve operable by the deflection of said tracer for actuating said reversing valve, a metering device for effecting a predetermined distance of travel of work and tool for certain directions of relative movement thereof, and a latching control valve for controlling the movements of said sequentially operated valves in conjunction with their control by the rotation of said tracer.

16. In a fluid pressure control circuit for effecting predetermined relative movements of work in a machine tool, the combination of a directionally effective tracer for determining the path of relative movement of work and tool, means for directionally positioning said tracer, a series of three sequentially operated fluid pressure control valves actuated by the directional movement of said tracer, fluid pressure latching means associated with said valves rendered operative by the actuation thereof by the direction of movement of said tracer, and a latching control valve associated with said valves for rendering said latching means inoperative by the movement of said tracer head to predetermined directional positions.

17. In a machine tool having a pair of relatively movable members, actuating means for effecting a relative movement between said members, directional control means for varying the direction of said relative movement, a fluid pressure control system for said actuating and control means including a series of sequentially operable fluid pressure control devices comprising a trip operable control valve actuated by the relative movement of said members to predetermined positions, a reversing valve for changing the direction of operation of said directional control means operated by the actuation of said trip control means, a pilot control valve rendered operative by the operation of said trip control means and the operation of said reversing valve to stop operation of the actuating means for said machine members and to render said direction control means operative, a control valve rendered operative by the initial operation of said directional control means to maintain the continued operation of said directional control means after the tripping of said trip control means, a second control valve rendered operative after a predetermined change of direction of relative movement to stop operation of said directional control means and cause said actuating means to become operative, a fluid pressure metering device permitting said actuating means to continue operation for a predetermined distance of relative movement of said machine members, a latching control valve operable to shift the position of said second-mentioned control valve and a third control valve to again arrest operation of said actuating means and cause actuation of said direction control means, and means whereby said first and third control valves are actuated upon a further predetermined amount of change in direction of relative movement of said machine members by the operation of said directional control means to arrest further operation of said directional control means and reestablish operation of said actuating means for said machine members.

18. In a fluid pressure control circuit for a pattern controlled milling machine having a trip control tracer for determining the direction and relative movement of work and tool therein, fluid pressure control means associated with fluid pressure actuating means for rotating said tracer head to predetermined directional positions to automatically effect predetermined directions of relative movement of work and tool, a reversing valve for changing the direction of rotation of said fluid pressure actuating means, a pilot control valve operable by the deflection of said tracer to alternately cause rotation of said tracer or relative feeding of work and tool, and a fluid pressure metering device for effecting definite distances of relative movement of work and tool rendered operative by the rotation of said tracer to predetermined directional positions.

19. In a hydraulic control circuit for the relative movements of work and tool in a machine tool, the combination of a profile tracer head, a tracer selector valve in said head, a progression selector valve, a plurality of cam operated control valves, a hydraulic motor for rotating said profile tracer head, a reversing valve for said motor, a pilot control valve operable by the deflection of the tracer of said tracer head for effecting alternate actuation of said hydraulic motor or causing relative movement of work and tool, a fluid pressure metering device for determining the distance of relative travel of work and tool, a supplemental control valve associated with said cam operated control valves, and a control pattern in said machine adapted to be engaged by said tracer at predetermined positions of relative movement of work and tool.

20. In a progression control mechanism for a pattern controlled milling machine having a power operable transmission inclding a direction determinator for producing different directions of relative movement between a cutter and work piece and a power operable device for rotating said determinator, the combination of manually operable means for adjusting said determinator to orient said relative movement to a predetermined direction, a tracer and pattern for determining the limits of said relative movement, means responsive to deflection of the tracer by the pattern during the progress of said movement to start said power operable device and simultaneously stop said power operable transmission to effect a change in direction and simultaneously relieve the deflection of the tracer, said responsive means reacting to undeflection of the tracer to restart said power operable transmission and effect a progression movement, and adjustable means for determining the extent of said progression movement.

21. In an automatic die-sinking machine having a cutting tool and a work support mounted for universal relative movement in a profile plane and for movement normal to said plane power operable means for effecting said plane including a direction determinator, a tracer and a profile determining pattern cooperatively related and operatively connected for continuous control of said determinator to effect an outlining cut corresponding to the pattern, and a second tracer and pattern cooperatively related and operatively coupled for automatically controlling the depth of said cut, the combination of selector means movable for disconnecting the determinator from its controlling tracer to obtain a rectilinear cutting path cross sectionally of the profile pattern, cyclically operable mechanism coupleable with the determinator by said selector means for automatically effecting successive right angular indexing movements of said determinator to establish a laterally displaced rectilinear cutting path parallel to the first cutting path, and means in said mechanism coupleable with the first-named tracer by said selector means and responsive to deflection thereof to initiate an automatic cycle of said mechanism whereby the entire work surface within the outlining cut may be scanned by the cutting tool in a single continuous automatic cycle.

22. In a pattern controlled machine tool having a pair of relatively movable slides, power operable means for actuating said slides, one of said slides being adapted to carry a work piece and a pattern and the other having mounted thereon a cutter and tracer, the combination with a directional controller for said power operable means for determining the direction of a plane of relative movement of the cutter with respect to the work, of fluid pressure means for orienting said directional controller, said pattern being cavitated whereby the tracer is free during said relative movement of the cutter, means responsive to deflection of the tracer by engagement with the pattern to stop said power operable means and cause operation of said fluid pressure means to index said directional controller, and trip operable means responsive to said operation for limiting rotation of said controller to an angle of 90° and sequentially instituting actuation of said power operable means.

23. In a pattern controlled machine tool having a pair of relatively movable slides, power operable means for actuating said slides, one of said slides being adapted to carry a work piece and a pattern and the other having mounted thereon a cutter and tracer, the combination with a directional controller for said power operable means for determining the direction of a plane of relative movement of the cutter with respect to the work, of fluid pressure means for orienting said directional controller, said pattern being cavitated whereby the tracer is free during said relative movement of the cutter, means responsive to deflection of the tracer by engagement with the pattern to stop said power operable means and cause operation of said fluid pressure means to index said directional controller, trip operable means responsive to said operation for limiting rotation of said controller to an angle of 90° and sequentially instituting actuation of said power operable means, and means to limit the extent of said last-named actuation.

24. In a pattern controlled machine tool having a pair of relatively movable slides, power operable means for actuating said slides, one of said slides being adapted to carry a work piece and a pattern and the other having mounted thereon a cutter and tracer, the combination with a directional controller for said power operable means for determining the direction of a plane of relative movement of the cutter with respect to the work, of fluid pressure means for orienting said directional controller, said pattern being cavitated whereby the tracer is free during said relative movement of the cutter, means responsive to deflection of the tracer by engagement with the pattern to stop said power operable means and cause operation of said fluid pressure means to index said directional controller, trip operable means responsive to said operation for limiting rotation of said controller to an angle of 90° and sequentially instituting actuation of said power operable means, and means to limit the extent of said last-named actuation, and sequentially institute a second 90° rotation of said directional controller by said fluid pressure means.

25. In a pattern controlled machine tool having a pair of relatively movable slides, power operable means for actuating said slides, one of said slides being adapted to carry a work piece and a pattern and the other having mounted thereon a cutter and tracer, the combination with a directional controller for said power operable means for determining the direction of a plane of relative movement of the cutter with respect to the work, of fluid pressure means for orienting said directional controller, said pattern being cavitated whereby the tracer is free during a said relative movement of the cutter, means responsive to deflection of the tracer by engagement with the pattern to stop said power operable means and cause operation of said fluid pressure means to index said directional controller, trip operable means responsive to said operation for limiting rotation of said controller to an angle of 90° and sequentially instituting actuation of said power operable means, means to limit the extent of said last-named actuation, and sequentially institute a second 90° rotation of said directional controller by said fluid pressure means, and means operable by said fluid pressure means for stopping said indexing movement and instituting operation of said power operable means whereby a second feeding movement of the cutter will be effected in a plane parallel to the first-named plane.

26. In a pattern controlled milling machine having a pair of relatively movable slides, power operable means for actuating said slides, one of said slides being adapted to support a work piece and a pattern in cooperative relation to a cutter and tracer mounted on the other of said slides, the combination with a direction determinator operatively connected with said power operable means for determining the resultant direction of a plane of relative feeding movement of the cutter, said pattern being cavitated whereby the tracer is free during movement of the cutter, means responsive to deflection of the tracer upon engagement with the pattern to stop said power operable means and effect a quarter revolution of said direction determinator, means movable with said direction determinator for sequentially starting said power operable means upon completion of said quarter revolution whereby the cutter will move in a plane normal to its first plane of movement, and means responsive to any further deflection of the tracer during said last-named movement to stop said power operable means and cause further rotation of said direction determinator until said tracer becomes undeflected.

27. In an automatic pattern controlled machine tool having a pair of slides for supporting a cutter and tracer in operative relation to a work piece and pattern, power operable means for actuating said slides and a common rotatable rate and direction control member operatively connected with said power operable means for determining the rate and resultant direction of movement of said slides, the combination of means for adjusting said control member for a given plane of movement of the cutter with respect to the work, power operable means for rotating said control member, means responsive to deflection of the tracer by engagement with the pattern to stop said slides and cause operation of said power operable means for rotating said control member, and means responsive if the tracer is disengaged from the pattern by said rotation for causing actuation of said slides.

28. In an automatic pattern controlled machine tool having a pair of slides for supporting a cutter and tracer in operative relation to a work piece and pattern, power operable means for actuating said slides and a common rotatable rate and direction control member operatively connected with said power operable means for determining the rate and resultant direction of movement of said slides, the combination of means for adjusting said control member for a given plane of movement of the cutter with respect to the work, power operable means for rotating said control member, means responsive to deflection of the tracer by engagement with the pattern to stop said slides and cause operation of said power operable means for rotating said control member, and means selectively operable to cause actuation of said slides if the tracer is disengaged from the pattern by said rotation, or to cause further rotation of said directional control member if the tracer is not disengaged from said pattern.

29. In an automatic pattern controlled machine tool having a pair of slides for supporting a cutter and tracer in operative relation to a work piece and pattern, power operable means for actuating said slides and a common rotatable rate and direction control member operatively connected with said power operable means for determining the rate and resultant direction of movement of said slides, the combination of means for adjusting said control member for a given plane of relative movement of the cutter with respect to the work, power operable means for rotating said control member, means responsive to engagement of the tracer with the pattern to stop said power operable means and cause rotation of said direction control member until the tracer has been disengaged from the pattern.

30. In a pattern controlled milling machine having a pair of slides, fluid operable means for shifting said slides, a common and rate direction control member operatively connected with said fluid operable means for determining the direction of resultant movement of simultaneous operation of said slides, fluid pressure actuating means for rotating said control member, a tracer operable when deflected by engagement with a pattern to cause operation of said fluid pressure actuating means, a control cam rotatable with said control member, means operable in response to rotation of said cam by said control member for stopping said rotation at a predetermined position, said cam also causing operation of said fluid operable means to cause resultant movement of said slides normal to the first direction of resultant movement, means for stopping said last-named movement and causing further rotation of said cam and direction control member to a second predetermined position whereby a resultant movement of the slides may be instituted parallel to the first direction of resultant movement.

31. In a pattern controlled milling machine having a 360° tracer head and a tracer operatively connected for controlling rotation of said head to determine the effective direction of relative movement between a cutter and a work piece, the combination of an auxiliary hydraulic control circuit including means for maintaining said tracer head in a predetermined position to produce a given direction of relative movement between the cutter and work while the tracer remains undeflected, means rendered effective by the deflection of said tracer to rotate said head through a predetermined angle to institute a cross indexing movement perpendicular to the first movement, and means operable independent of the movement of said tracer to cause further rotation of said tracer head to reverse the direction of said longitudinal feeding movement after said cross indexing movement has been completed.

32. In a hydraulic control system for a pattern controlled milling machine, the combination of means for arranging said machine to perform profiling operations or automatic progressive scanning operations by relative movement between the tool and work piece, a 360° rotatable tracer head having a tracer adapted to engage a pattern, fluid pressure means for rotating said head, means for coupling said fluid pressure means for direct control by the tracer for profiling operations, an automatic progression control mechanism, means for alternatively connecting said fluid pressure means to said automatic progression control mechanism, said mechanism including a control cam rotatable in response to deflection of the tracer by the pattern, a series of sequentially operated control valves actuated by said cam upon rotation of said tracer head to control starting and stopping of said slides, and starting and stopping of the rotation of said head and fluid pressure latching means associated with said control valves operable to determine the sequential operation of said valves.

33. In an automatic pattern control machine for producing die cavities and the like, the combination with a tool support, a die support, a reversible power operable means for effecting relative movement between the supports in parallel paths, of means for controlling the depth of movement of the tool into the die during said relative movement including a pattern and tracer, a second pattern for determining the outline of the cavity to be formed, a direction controller for said power operable means, means to lock the controller in a given position for determining the direction of the plane of said relative movement, a second tracer engageable with said outline pattern for determining the extent of said relative movement and automatic power operable mechanism energized in response to engagement of the tracer with the pattern to effect progressive lateral indexing of the tool at the end of each traverse across the die and a reversal of said direction controller whereby the die will be scanned by a plurality of parallel feeding movements of the tool.

34. In a pattern controlled machine tool having a pair of relatively movable slides, power operable means for actuating said slides and a direction controller for proportioning the rates of movement of said slides to determine the final direction of resultant movement between a tool and a work piece, said power operable means including a pair of hydraulic motors, a common return line therefor, a pattern and tracer, one of which is movable with the tool, means responsive to engagement of the tracer with the pattern to block said return line to stop the movement of said slides, a power operable device, means responsive to engagement of the tracer with the pattern to initiate operation of said device, means driven by said device for connecting said common return to a metering cylinder to control the extent of a cross indexing movement between the tool and work, and means responsive to a rise in pressure in said metering cylinder to change the direction of relative movement of the slides and unblock said return line to initiate a second feeding movement.

ALBERT H. DALL.
HERMAN HORLACHER.

REFERENCES CITED

The following references are of record in the file of this patent:

UNITED STATES PATENTS

| Number | Name | Date |
| --- | --- | --- |
| 1,985,225 | Archea | Dec. 25, 1930 |
| 2,142,061 | Sassen | Dec. 27, 1938 |
| 2,184,708 | Bolas | Dec. 26, 1939 |